(12) United States Patent
Tene et al.

(10) Patent No.: US 9,928,072 B1
(45) Date of Patent: Mar. 27, 2018

(54) DETECTING AND RECORDING ATOMIC EXECUTION

(75) Inventors: Gil Tene, Los Altos Hills, CA (US); Michael A. Wolf, San Francisco, CA (US); Cliff N. Click, Jr., San Jose, CA (US)

(73) Assignee: Azul Systems, Inc., Sunnyvale, CA (US)

( * ) Notice: Subject to any disclaimer, the term of this patent is extended or adjusted under 35 U.S.C. 154(b) by 975 days.

(21) Appl. No.: 12/387,478

(22) Filed: May 1, 2009

Related U.S. Application Data

(60) Provisional application No. 61/126,231, filed on May 2, 2008, provisional application No. 61/195,407, filed on Oct. 6, 2008.

(51) Int. Cl.
*G06F 9/30* (2006.01)
*G06F 9/38* (2018.01)
*G06F 11/36* (2006.01)

(52) U.S. Cl.
CPC ........ *G06F 9/3842* (2013.01); *G06F 11/3636* (2013.01)

(58) Field of Classification Search
CPC ........................... G06F 11/3636; G06F 9/3842
See application file for complete search history.

(56) References Cited

U.S. PATENT DOCUMENTS

| | | | |
|---|---|---|---|
| 5,313,609 A * | 5/1994 | Baylor et al. | 711/121 |
| 5,860,017 A | 1/1999 | Sharangpani et al. | |
| 5,938,775 A * | 8/1999 | Damani et al. | 714/15 |
| 6,101,524 A * | 8/2000 | Choi et al. | 718/102 |
| 6,347,360 B1 * | 2/2002 | Moudgal et al. | 711/133 |
| 6,360,314 B1 | 3/2002 | Webb et al. | |
| 6,370,625 B1 | 4/2002 | Carmean et al. | |
| 6,487,652 B1 | 11/2002 | Gomes et al. | |

(Continued)

FOREIGN PATENT DOCUMENTS

WO WO 2006077260 A1 * 7/2006

OTHER PUBLICATIONS

Hower et al. (Rerun: Exploiting Episodes for Lightweight Memory Race Recording) ; This paper appears in: Computer Architecture, 2008. ISCA '08. 35th International Symposium on; Issue Date: Jun. 21-25, 2008; On pp. 265-276.*

(Continued)

*Primary Examiner* — Keith Vicary
(74) *Attorney, Agent, or Firm* — Van Pelt, Yi & James LLP

(57) ABSTRACT

A system includes a processor configured to: initiate atomic execution of a plurality of instruction units in a thread, starting with a beginning instruction unit in the plurality of instruction units, wherein the plurality of instruction units is not programmatically specified to be executed atomically; detect an atomicity terminating event during atomic execution of the plurality of instruction units, wherein the atomicity terminating event is triggered by a memory access by another processor; and establish an incidentally atomic sequence of instruction units based at least in part on detection of the atomicity terminating event, wherein the incidentally atomic sequence of instruction units correspond to a sequence of instruction units in the plurality of instruction units. The system further includes a memory coupled to the processor, configured to provide the processor with the plurality of instruction units.

20 Claims, 20 Drawing Sheets

(56) References Cited

U.S. PATENT DOCUMENTS

| | | |
|---|---|---|
| 6,625,635 B1* | 9/2003 | Elnozahy ................ 718/102 |
| 6,631,514 B1 | 10/2003 | Le |
| 6,662,360 B1 | 12/2003 | Hay et al. |
| 6,732,363 B1 | 5/2004 | Chaudhry et al. |
| 6,748,496 B1 | 6/2004 | Scarpino |
| 6,854,108 B1* | 2/2005 | Choi ...................... 717/125 |
| 6,862,664 B2 | 3/2005 | Tremblay et al. |
| 6,938,130 B2 | 8/2005 | Jacobson et al. |
| 7,120,762 B2 | 10/2006 | Rajwar et al. |
| 7,269,717 B2 | 9/2007 | Tremblay et al. |
| 7,376,800 B1 | 5/2008 | Choquette et al. |
| 7,475,230 B2 | 1/2009 | Chou et al. |
| 7,500,087 B2 | 3/2009 | Saha |
| 7,506,318 B1* | 3/2009 | Lindo et al. .............. 717/130 |
| 7,516,453 B1* | 4/2009 | Bugnion ..................... 718/1 |
| 7,765,364 B2 | 7/2010 | Rajwar et al. |
| 7,849,446 B2* | 12/2010 | Lev et al. ................ 717/124 |
| 2003/0014602 A1 | 1/2003 | Shibayama et al. |
| 2003/0074602 A1* | 4/2003 | Lomet et al. ............... 714/15 |
| 2003/0079094 A1 | 4/2003 | Rajwar et al. |
| 2003/0084271 A1 | 5/2003 | Lindwer |
| 2003/0167292 A1 | 9/2003 | Ross |
| 2003/0208673 A1 | 11/2003 | Chaudhry et al. |
| 2004/0117573 A1 | 6/2004 | Sutanto et al. |
| 2004/0162948 A1 | 8/2004 | Temblay et al. |
| 2004/0162967 A1* | 8/2004 | Tremblay et al. ........... 712/228 |
| 2004/0162968 A1 | 8/2004 | Tremblay et al. |
| 2004/0163082 A1 | 8/2004 | Tremblay et al. |
| 2004/0187115 A1 | 9/2004 | Tremblay et al. |
| 2004/0187116 A1 | 9/2004 | Tremblay et al. |
| 2004/0187123 A1 | 9/2004 | Tremblay et al. |
| 2005/0050386 A1* | 3/2005 | Reinhardt et al. ........... 714/13 |
| 2005/0055593 A1 | 3/2005 | Shah et al. |
| 2005/0204119 A1* | 9/2005 | Saha ................. G06F 9/3004 712/235 |
| 2005/0268073 A1 | 12/2005 | Karp |
| 2006/0167951 A1* | 7/2006 | Vertes ..................... 707/200 |
| 2007/0143550 A1* | 6/2007 | Rajwar et al. ............. 711/146 |
| 2007/0174695 A1* | 7/2007 | Varadarajan et al. ......... 714/15 |
| 2007/0198676 A1* | 8/2007 | Vertes ..................... 709/223 |
| 2008/0016325 A1* | 1/2008 | Laudon et al. ............. 712/217 |
| 2008/0046696 A1* | 2/2008 | Vertes ..................... 712/214 |
| 2008/0086730 A1* | 4/2008 | Vertes ..................... 718/100 |
| 2008/0270770 A1* | 10/2008 | Vertes et al. .............. 712/227 |
| 2009/0119493 A1* | 5/2009 | Venkitachalam et al. ..... 712/238 |
| 2009/0119549 A1* | 5/2009 | Vertes ...................... 714/47 |
| 2009/0133033 A1* | 5/2009 | Lindo et al. .............. 718/108 |
| 2009/0144742 A1* | 6/2009 | Subhraveti et al. ......... 718/104 |
| 2009/0254724 A1* | 10/2009 | Vertes et al. .............. 711/162 |
| 2010/0251031 A1* | 9/2010 | Nieh et al. ................. 714/45 |
| 2010/0275260 A1* | 10/2010 | Bergheaud et al. ........... 726/21 |

OTHER PUBLICATIONS

Tanenbaum (Structured Computer Organization: Third Edition); Prentice-Hall, Inc; 1990; 5 pages.*
Russinovich et al. (Replay for Concurrent Non-Deterministic Shared-Memory Applications); Proceeding PLDI '96 Proceedings of the ACM SIGPLAN 1996 conference on Programming language design and implementation; 1996, pp. 258-266.*
Slye et al. (Supporting Nondeterministic execution in Fault-Tolerant Systems); The Twenty-Sixth Annual International Symposium on Fault-Tolerant Computing (FTCS '96); pp. 250-259.*
Martinez et al. "Speculative Synchronization in Shared Memeory Multiprocessors", Technical Report UIUCDSC-R-2001-2255, Univerisy of Illinois at Urbana-Champaign, Nov. 2001.
U.S. Appl. No. 11/227,418, filed Sep. 14, 2005, Tene et al.
U.S. Appl. No. 11/227,422, filed Sep. 14, 2005, Tene et al.
U.S. Appl. No. 11/227,417, filed Sep. 14, 2005, Tene et al.
Rajwar et al, Improving the Throughput of Synchronization by Insertion of Delays, (HPCA), Jan. 2000.
Hammond et al., Programming with Transactional Coherence and Consistency (TCC), 2004.
Hammond et al., Transactional Memory Coherence and Consistency, Stanford University.
Hammond et al., Transactional Memory Coherence and Consistency, "all transaction, all the time", Stanford University, Jun. 21, 2004.
Sean Lie, Hardware Support for Unbounded Transactional Memory, Massachusetts Institute of Technology, May 7, 2004.
Herlihy et al., Transactional Memory: Architectural Support for Lock-Free Data Structures, University of Massachusetts.
Rajwar et al., Speculative Lock Elision: Enabling Highly Concurrent Multithreaded Execution, University of Wisconsin-Madison, (MICRO), Dec. 2001.
Rajwar et al., Transactional Lock-Free Execution of Lock-Based Programs, University of Wisconsin-Madison, (ASPLOS), October.
Ravi Rajwar, Speculation-Based Techniques for Lock-Free Execution of Lock-Based Programs, University of Wisconsin-Madison, 2002.
Ananian et al., Unbounded Transactional Memory, Feb. 2005.
Hammond et al, Transactional Memory Coherence and Consistency, Stanford University, 2004.
Martinez et al., Speculative Locks for Concurrent Execution of Critical Sections in Shared-Memory Multiprocessors, Jose F. Martinez and Josep Torrellas, Workshop on Memory Performance Issues, Intl. Symposium on Computer Architecture, Jun. 2001 ("Speculative Locks 2001").
Martinez et al., Speculative Locks for Concurrent Execution of Critical Sections in Shared-Memory Multiprocessors, Jose F. Martinez and Josep Torrellas, Technical Report, UIUCCS-R-2001-2202, UILU-ENG-2001-1706, Department of Computer Science, University of Illinois, Feb. 2001 ("Speculative Locks Tech. Report 2001").
Martinez et al., Speculative Synchronization: Applying Thread-Level Speculation to Explicitly Parallel Applications, Advanced Symposium on Programming Languages and Operating Systems, Oct. 2002, San Jose, CA ("Speculative Synch. 2002").
Stone et al., Multiple Reservations and the Oklahoma Update, IEEE Parallel and Distributed Technology, 1993 ("Oklahoma Update 1993").
Steven S. Lumetta, Detection of Synchronization Errors through Speculative Lock Elision, Supplement of the International Conference on Dependable Systems and Networks, Bethesda, Maryland, Jun. 2002 ("Synchronization Errors 2002").
"Annual Review of Scalable Computing" edited by Yuen Chung Kwong (National University of Singapore); Pub. date. 2000.
Moshovos et al., "Dynamic speculation and synchronization of data dependences" University of Wisconsin-Madison; This paper appears in: Computer Architecture, 1997. Conference Proceeding. The 24th Annual International Symposium on; Publication Date: Jun. 2-4, 1997; pp. 181-193.
Chen et al., "TEST: A Tracer for Extracting Speculative Threads", The 2003 International Symposium on Code Generation and Optimization, San Francisco, CA, Mar. 2003.
Cintra et al., "Eliminating squashes through learning cross-thread violations in speculative parallelization for multiprocessors", Div. of Informatics, Edinburgh Univ., UK; This paper appears in: High-Performance Computer Architecture, 2002. Proceedings. Eighth International Symposium on Publication Date: Feb. 2-6, 2002 On pp. 43-54.
Steffan et al., Improving value communication for thread-level speculation, Dept. of Comput. Sci., Carnegie Mellon Univ., Pittsburgh, PA, USA; This paper appears in: High-Performance Computer Architecture, 2002. Proceeding. Eighth International Symposium on Publication Date: Feb. 2-6, 2002; On pp. 65-75.
Rajwar et al., Speculative lock elision: enabling highly concurrent multithreaded execution, Dept. of Comput. Sci., Wisconsin Univ., Madison, WI, USA; This paper appears in: Microarchitecture, 2001. MICRO-34. Proceedings. 34th ACM/IEEE International Symposium on; Publication Date: Dec. 1-5, 2001; On pp. 294-305.
Dunlap et al. "Execution replay of multiprocessor virtual machines." Proceedings of the fourth ACM SIGPLAN/SIGOPS international conference on Virtual execution environments. ACM, 2008.
Hill et al., "A Case for Deconstructing Hardware Transactional Memory Systems".

(56) References Cited

OTHER PUBLICATIONS

Rajwar et al., "Speculative Lock Elision: Enabling Highly Concurrent Multithreaded Execution", IEEE, 2001.

* cited by examiner

| Global Time | Thread A | PC_A | Thread B | PC_B | Thread C | PC_C |
|---|---|---|---|---|---|---|
| t0 | ld r1 ← [x] | 1 | ... | ... | ... | |
| | add r1 ← y, r1 | L2 | ... | ... | ... | |
| | bne r1, z, L2 | 3 | | | | |
| | Sub r1 ← r1, 1 | 10 | ... | ... | ... | |
| | St [x] ← r1 | 11 | | | | |
| | Shr r1, 7 | 12 | | | ... | |
| t1 | Shl r1, 8 | 13 | ld r1 ← [x] | 25 | | |
| | ... | | ... | ... | 204 ... | |
| t2 | ... | | Sub r3 ← r3, 1 | 49 | St [x] ← r1 | 208 |
| | | | add r2 ← z, 5 | 50 | | |
| | | | ... | | ... | |
| | | | ... | | | |
| t3 | | | | | ld r3 ← [y] | 298 |
| | | | | | ... | |

FIG. 2

α = Save Modified Data, Store

| Instructions | Program Counter |
|---|---|
| ATOMIC_EXECUTE | 105 |
| ld | 106 |
| add | L107 |
| bne | 108 |
| ... | ... |
| shl | 3497 |

← Atomicity Terminating Event

```
Trap Handler (NSMA Success)
COMMIT
CLEAR MARKER
RECORD
ATOMIC_EXECUTE
RETURN
```

| | |
|---|---|
| shr | 3498 |
| ... | ... |
| abort | 5651 |

```
Trap Handler (NSMA Failure)
REVERT (3498-5651)
ATOMIC_EXECUTE
RETURN
```

| | |
|---|---|
| shr | 3498 |
| ... | ... |

FIG. 9

| Instructions | Program Counter |
|---|---|
| SPECULATE | 300 |
| ld | 301 |
| add | 302 |
| ... | ... |
| COMMIT_AND_CONTINUE | 389 |

```
Trap Handler
(COMMIT_AND_CONTINUE)

COMMIT
CLEAR MARKER
RECORD
RETURN
```

| | |
|---|---|
| shl | 390 |
| shr | 391 |
| ... | ... |
| shl | 415 |

← Atomicity Terminating Event

```
Trap Handler (ISMA Failure)
REVERT shl(390)-shl(415)
SPECULATE
RETURN
```

| | |
|---|---|
| shl | 390 |
| shr | 391 |
| ... | ... |

FIG. 10

| Instructions | Program Counter |
|---|---|
| SPECULATE 1000 | 300 |
| ld | 301 |
| add | L302 |
| bne | 303 |
| ... | ... |
| st | 880 |

Atomicity Terminating Event

```
Trap Handler (SMA Failure)
REVERT ld(301)-st(880)
SPECULATE 500
RETURN
```

| | |
|---|---|
| ld | 301 |
| add | 302 |
| ... | ... |
| shl | 800 |

```
Trap Handler (SMA Success)
COMMIT
CLEAR MARKER
RECORD
SPECULATE 50
RETURN
```

| | |
|---|---|
| shr | 801 |
| ... | ... |

FIG. 11

DETECTING AND RECORDING ATOMIC EXECUTION

CROSS REFERENCE TO OTHER APPLICATIONS

This application claims priority to U.S. Provisional Patent Application No. 61/126,231 entitled ENHANCEMENTS FOR MANAGED RUNTIME ENVIRONMENTS filed May 2, 2008, which is incorporated herein by reference for all purposes. This application claims priority to U.S. Provisional Patent Application No. 61/195,407 entitled ENHANCED MANAGED RUNTIME ENVIRONMENTS filed Oct. 6, 2008, which is incorporated herein by reference for all purposes.

BACKGROUND OF THE INVENTION

In computer systems, recording instructions and playing them back in exactly the same order as when the instructions were originally executed is sometimes referred to as deterministic record/replay. Deterministic record/replay has many useful applications. For example, a deterministic record/replay mechanism can allow the programmer to debug and diagnose undesirable behaviors, such as system crashes, and can also allow the system administrator to track security breaches and analyze intrusion behavior.

Implementing deterministic replay is a challenging task, particularly in multi-processor environments where concurrency and race conditions are frequently encountered. The most straightforward way to implement record/replay is to record every single instruction. A great amount of information would have to be recorded, making the technique highly inefficient and impractical. Some existing implementations of record/replay use a global lock to limit the execution of each thread to a predetermined number of instructions, such that a small amount of information is sufficient for replaying the processor's executions (for example, 50 instructions by thread A, 50 instructions by thread B, etc.). These limitations can change the concurrency behavior of the program. Therefore, the recordings from such a record/replay mechanism do not accurately reflect what actually happens in a real runtime environment where the program runs without any execution recording. For example, a hash table or some other shared memory structure may be accessed by multiple threads/processors concurrently, and the accessing threads and their operations may involve varying time lengths and/or number of instructions. Some existing recorders may only allow one processor to access the hash table for 50 instructions and keep the other processors waiting, then allow the next processor to access the hash table for 50 instructions exclusively. Thus, the access to the hash table is effectively serialized by the recorder.

BRIEF DESCRIPTION OF THE DRAWINGS

Various embodiments of the invention are disclosed in the following detailed description and the accompanying drawings.

FIG. 2 is a diagram illustrating an example code sequence that illustrates how atomicity terminating events terminate atomic execution of instructions.

FIG. 9 is an example sequence of instructions illustrating the operations of NSMA.

FIG. 10 is an example sequence of instructions illustrating the operations of ISMA.

FIG. 11 is an example sequence of instructions illustrating the operations of SMA.

DETAILED DESCRIPTION

Figure 1:
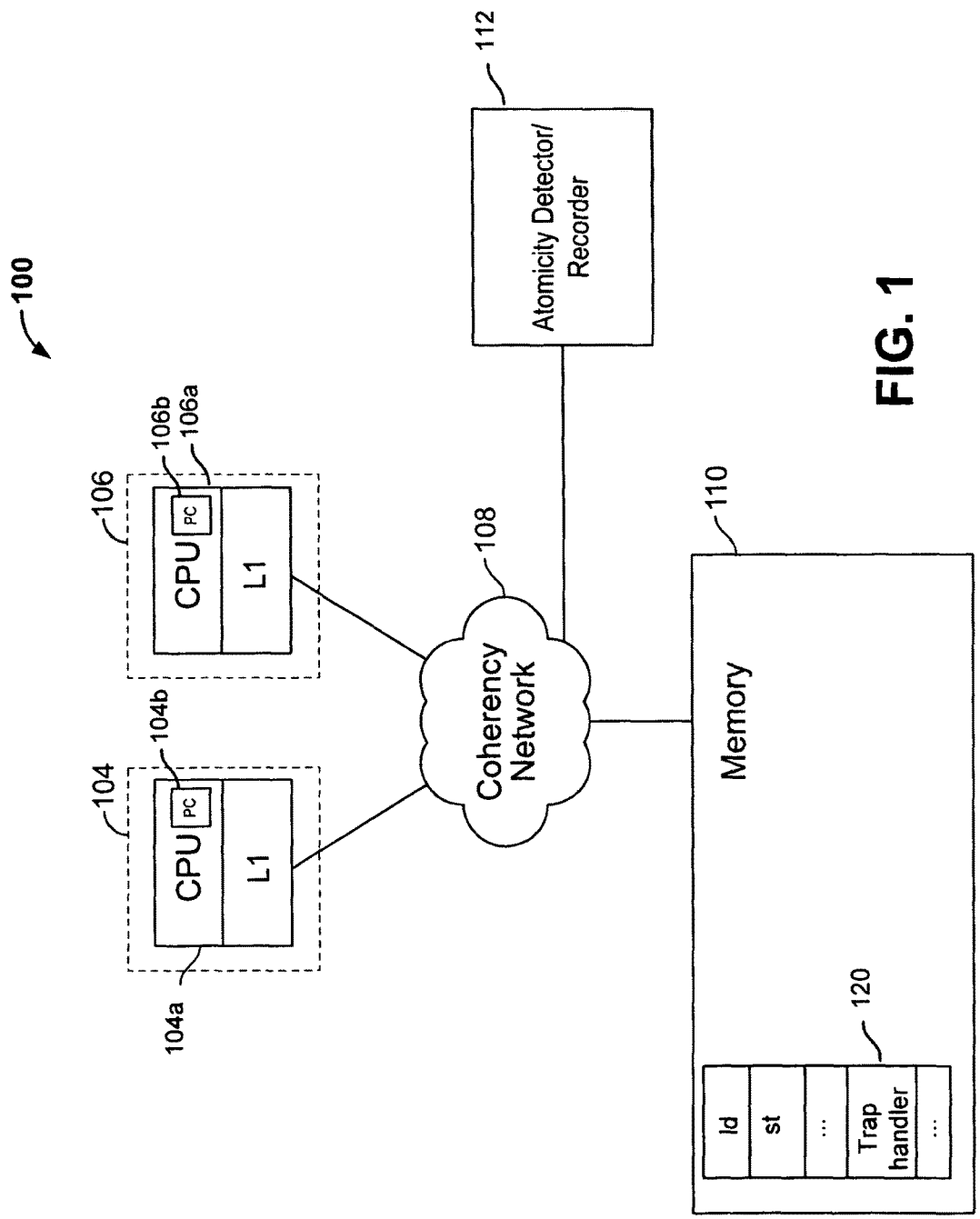
FIG. 1 is a block diagram illustrating an embodiment of a system that supports atomic range detection.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Atomicity detection and recording are disclosed. In a multi-processor computing environment, runtime conditions may vary. Thus, a set of program instruction units that are not programmatically specified to be executed atomically (i.e., the instruction units do not employ locks, semaphores, explicit atomic statements, or other types of programmatic synchronization mechanisms at source code level that explicitly specifies that the set of instruction units should be executed atomically) may exhibit non-deterministic atomicity at runtime (i.e., the instruction units may be executed atomically sometimes and non-atomically other times). For example, in some cases a thread may in one instance run atomically until a read/write request of a shared cache line from another thread is received, and in another instance run atomically until an I/O operation or a system call is received. Consequently, the sequence of atomically executed instruction units may differ in these different instances. Techniques are described for establishing that a sequence of instruction units is actually executed atomically during a particular run of the program. Such a sequence of instruction units is referred to as an incidentally atomic sequence of instruction units, since the sequence is established to have been atomically executed during a particular instance of execution and is not guaranteed to be atomically executed other times. An incidentally atomic sequence of instruction units may be recorded and played back. A particular instance of execution of a program may include multiple incidentally atomic sequences of instruction units, which can all be recorded and replayed.

In some embodiments, an atomically executed sequence of instruction units is established by atomically executing a plurality of instruction units in a thread, and detecting an atomicity terminating event that is triggered by a memory access by another processor, an explicit atomic terminating instruction, or a cache eviction. Examples of the atomicity terminating event include a conflicting read/write request, a cache eviction, or an operation that makes non-cache access.

FIG. 1 is a block diagram illustrating an embodiment of a system that supports atomic range detection. In this example, system 100 is shown to include a processor comprising a number of cache domains such as cache domains 104 and 106, coherency network 108, and atomicity detector/recorder circuitry 112. System 100 further includes a main memory 110. Each cache domain is shown to include a processor (in this case a central processing unit (CPU)), and an L1 cache coupled to the CPU for providing the CPU with temporary data storage. In some embodiments, each cache domain includes multiple cache levels such as a two level L1/L2 cache. As will be described in greater detail below, the caches are used to facilitate atomic execution detection and recording. CPUs 104*a* and 106*a* include program counters (PC) 104*b* and 106*b*, respectively. Memory 110 is configured to provide the processors with program instructions and to store data. One or more trap handlers (e.g. trap handler 120) are included in the memory to handle conditions that terminate atomic execution. Details of the trap handlers are provided below.

Cache domains 104 and 106 and memory 110 communicate over coherency network 108. Cache domains 104 and 106 share memory 110. Every element connected to coherency network 108 is coherent. There are numerous ways in which memory coherency can be maintained. In some embodiments, system 100 follows a cache coherency protocol that includes a modify, share, and/or invalid state, such as MSI or MESI protocol. The coherency network may use snoops, directory-based, broadcast, or other protocols. System 100 could include any number of processors, threads, memory, and any number of cache domains. Memory 110 could be a global memory and system 100 could include any type of local memory. In this example, a cache line in the modify state can return the invalid state in response to a coherency request. In addition, each cache has an ability to write back to memory or save data when a store is performed.

An atomicity detector/recorder 112 is coupled to the CPUs. The atomicity detector/recorder may be implemented as a part of: a virtual machine, a library, an operating system, a hypervisor, a processor or logic circuit, as a part of the coherency network, or any other appropriate software component and/or hardware circuitry of a computing system. Although a single component is shown in this example, separate components may be used to implement the detector and the recorder functions separately. For purposes of example, a detector/recorder that is implemented as logical circuit integrated with the L1 cache is described in detail below. Other implementations can be used in different embodiments.

FIG. 2 is a diagram illustrating an example code sequence that illustrates how atomicity terminating events terminate atomic execution of instructions. In this example, three threads Thread A, Thread B, and Thread C operate concurrently on separate CPUs. In the beginning, the instructions of each thread do not include any shared memory and each thread executes atomically. The machine instructions and program counter (PC) of Thread A are shown in detail in the example. Various cache lines are visible to Thread A, including a cache line that is assigned to variable r1. Immediately after the "shr" instruction is executed by Thread A and before the "shl" instruction is executed by the same thread, Thread B attempts to execute a "ld" instruction to load content from memory location [x] into r1, causing r1 to experience conflicting access by two threads and terminating the atomicity of Thread A's execution. The attempt by Thread B to access r1 is indicated by arrow 202. Here Thread B's "ld" instruction succeeds in preempting Thread A's atomic execution. Thus, in this instance, Thread A has an incidentally atomic sequence of 12 instructions so far. In this example, the sequence of incidentally atomic instructions with PC_A counter of 1 through 12, including the instructions repeatedly executed in the "add"/"bne" loop which spans program counter values of 2-9.

Thread B continues to execute atomically. Thread B also uses various cache lines to store its variables, including a cache line that is assigned to variable x. Immediately before the "add" instruction is executed by Thread B, at 204, Thread C attempts to execute a "st" instruction to store content into the cache line occupied by x. At this point x experiences conflicting access by multiple threads, and the atomic execution of Thread B is terminated. According to the program counter associated with Thread B, PC_B, Thread B has executed 25 instructions (i.e., instructions with PC_B count between 25-49 inclusively) in an incidentally atomic fashion.

In addition to conflicting access of shared cache lines by other threads running on other processors shown in the sample code sequence, thread atomicity may also be terminated when it is determined that the cache is full and must be evicted. This is because the atomicity of the thread that owns the cache can no longer be guaranteed once the eviction occurs and the cache lines are no longer valid. Another type of atomicity terminating event includes any attempt to execute an instruction that accesses non-cache memory, such as an I/O operation or a system call. Since cache lines and their associated tags are used to track thread execution atomicity, instructions that use non-cache memory cannot be tracked in the same way and thread execution atomicity cannot be guaranteed.

Figure 3A:
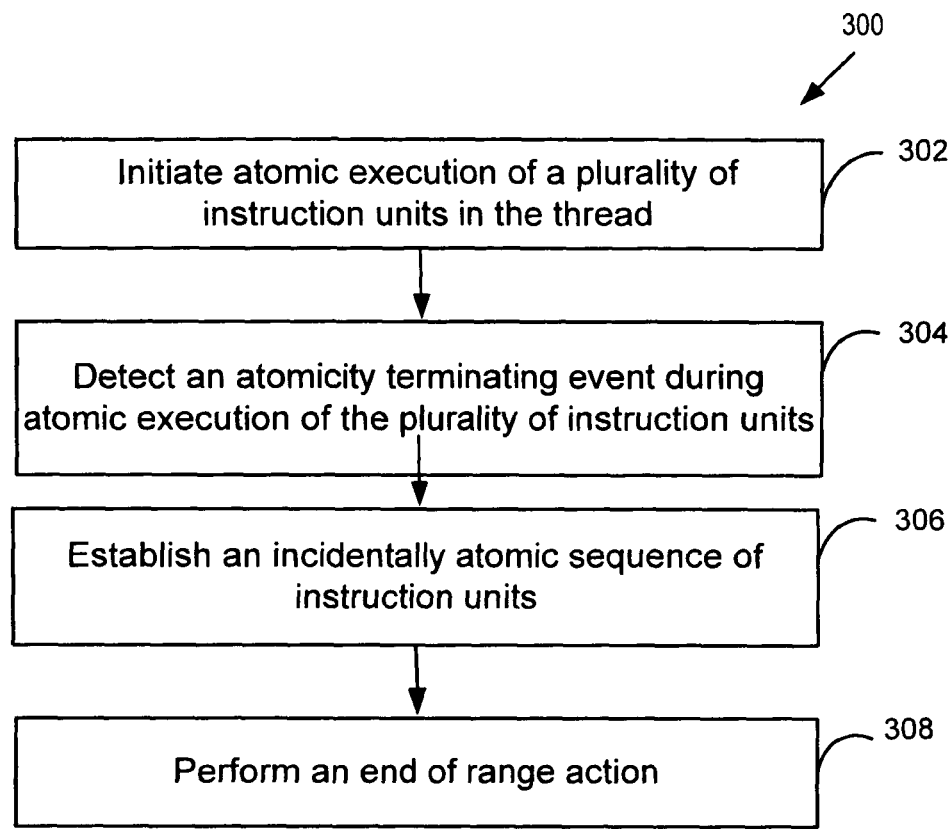
FIG. 3A is a flowchart illustrating an embodiment of a process for establishing an incidentally atomic sequence of instruction units executed in a thread.

By detecting atomicity terminating events, incidentally atomic sequences of instruction units can be established. FIG. 3A is a flowchart illustrating an embodiment of a process for establishing an incidentally atomic sequence of instruction units executed in a thread. As used herein, an instruction unit refers to a unit of execution within which thread execution is guaranteed to be atomic. In some embodiments, each machine instruction executed by a CPU is considered an instruction unit. In some embodiments, an instruction unit is the set of machine instructions that emulate a virtual machine instruction. In some embodiments, an instruction unit is a set of machine instructions that emulates a basic block of virtual machine instructions such as a block of instructions between two safe points. The execution of two or more instruction units, however, is not guaranteed to be atomic since atomicity may be terminated between instruction units. Depending on implementation, the instruction units may be instructions, branch-points where branch instructions are called, safepoints where the execution states of the CPU is known, etc. For purposes of example, in the following description instruction units that correspond to instructions are discussed in detail, although the techniques are generally applicable to other types of instruction units.

Process 300 may be implemented on a system such as system 100. In this example, process 300 begins at 302, where the atomic execution of instruction units in a thread is initiated, starting with a beginning instruction unit. The instruction units are typically executed by a single processor/CPU. The instruction units are not programmatically specified to be executed atomically, which is to say that there is no source code level synchronization mechanisms dictating that these instruction units should predictably execute atomically together. The plurality of instruction units in the thread is programmed to exhibit non-deterministic atomicity at runtime (i.e., the same set of instruction units may be run atomically sometimes and non-atomically sometimes). In contrast, any sequence of instruction units that is programmatically atomic relies on programmatic synchronization mechanisms, such as locks, semaphores, explicit atomic statements, etc., that specify atomicity of certain code sections at source code level such that a specific code section can be consistently and predictably executed atomically.

In some embodiments, the compiler or the runtime environment (for example, the processor) is configured to insert certain atomic execution instructions in the code to facilitate runtime incidentally atomicity detection. In such cases, the atomic execution starts with a beginning instruction unit that immediately follows an inserted special instruction such as an "ATOMIC_EXECUTE" or a "SPECULATE" instruction.

Figure 4:
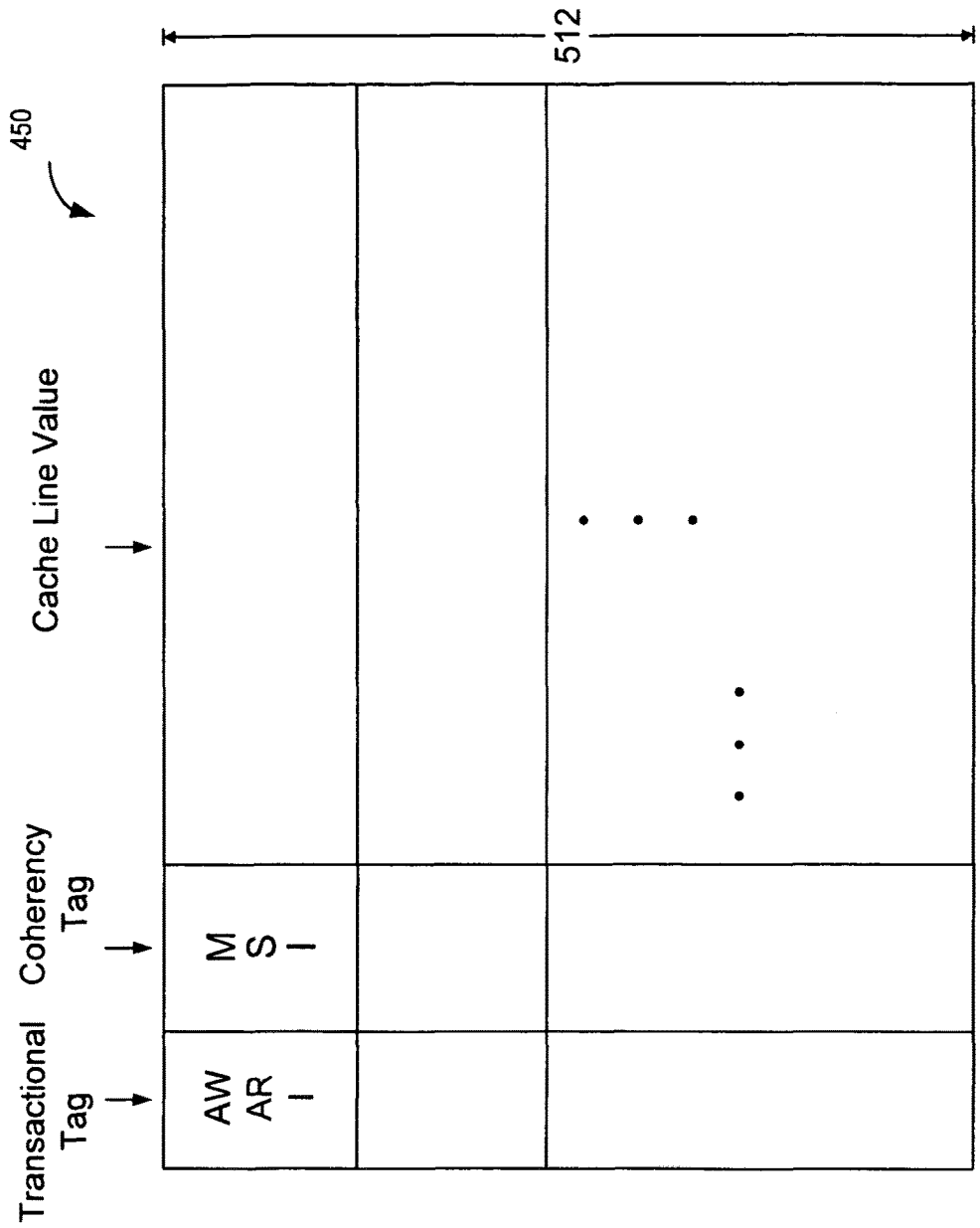
FIG. 4 is a block diagram illustrating an embodiment of a cache structure.

In some embodiments, during atomic execution, one or more cache memories such as cache 450 of FIG. 4 described below are modified by the thread's memory operations. The modification techniques are described more fully below.

The instruction units continue to execute atomically until some event occurs to terminate the atomic execution. At 304, an atomicity terminating event is detected while the instruction units are executing. In some embodiments, the atomicity terminating event is triggered by a conflicting memory access by another processor, for example a read request by another thread running in another processor to read a memory that is written by the currently executing thread, or a write request by the other thread running in the other processor to write to a memory that is visible to the currently executing thread. In some embodiments, the atomicity terminating event is triggered by an explicit atomicity terminating instruction that is inserted by the compiler or the runtime environment. In some embodiments, a self conflict such as a cache eviction or an instruction that accesses non-cache memory can also trigger an atomicity terminating event.

At 306, an incidentally atomic sequence of instruction units is established based at least in part on the detection of the atomicity terminating event. As used herein, an incidentally atomic sequence of instruction units refers to a sequence of instruction units that is atomically executed during a particular instance of execution. An incidentally atomic sequence of instruction units is not guaranteed to be atomically executed every time the program runs since the instruction units are not programmatically specified to be executed atomically. In other words, atomicity for an incidentally atomic sequence of instruction units results from the conditions of a particular runtime environment, and therefore is not guaranteed each time the program is executed. Here, the incidentally atomic sequence of instructions corresponds to a sequence of instructions that was actually executed atomically this time. In some embodiments, an ending instruction that was executed immediately before the occurrence of the atomicity terminating event is determined. The incidentally atomic sequence of instructions therefore corresponds to the sequence of executed instructions starting at the beginning instruction and ending at the ending instruction.

At 308, an end of range action is performed. The end of range action depends on implementation and in various embodiments includes clearing a memory marker (e.g., a transactional tag value) so that the memory can be reused by another atomic transaction, committing or revert back memory operations, and/or recording atomic execution information. Several examples are more fully described below.

Process 300 may be repeated to establish additional incidentally atomic sequences of instructions while the program executes.

Process 300 may be implemented on hardware with transactional memory support. In various embodiments, transactional memory modes such as Non-speculative Multi-address Atomicity (NSMA), Speculative Multi-address Atomicity (SMA) and Incrementally Speculative Multi-address Atomicity (ISMA) are implemented. In some embodiments, the hardware implementation of these atomicity schemes is facilitated by special cache design and cache coherency protocol. A single system may be implemented to operate in one or more modes.

Figure 3B:
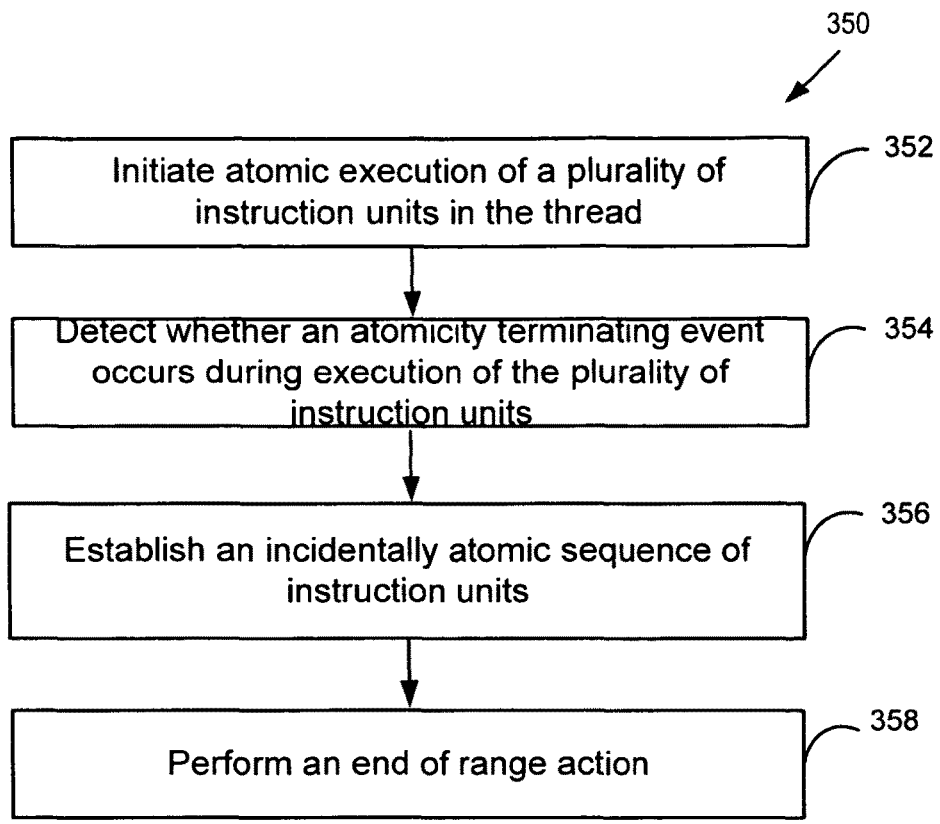
FIG. 3B is a flowchart illustrating another embodiment of a process for establishing an incidentally atomic sequence of instruction units executed in a thread.

FIG. 3B is a flowchart illustrating another embodiment of a process for establishing an incidentally atomic sequence of instruction units executed in a thread. In this example, process 350 begins at 352, where the atomic execution of a plurality of instruction units initiates. At 354, the system detects whether an atomicity terminating event occurs during execution. At 356, an incidentally atomic sequence of instruction units are established based at least in part on the fact that no atomicity terminating event occurred during execution of the plurality of instruction units. At 358, an end of range action is performed such as committing memory and/or clearing memory marker is performed.

An example implementation of a cache and associated cache coherency protocol that supports transactional memory modes is described below. FIG. 4 is a block diagram illustrating an embodiment of a cache structure. Cache 450 may be used, for example, as an L1 cache in a system such as 100. In this example, cache 450 includes 512 lines each being in one of six states: invalid, share atomic execution read, share commit, modify atomic execution written, modify atomic execution read, and modify commit. In this example, each line is marked as being in a state using the transactional tag value and the coherency tag value. The coherency tag value indicates whether the line is in a modify (M), share (S), or invalid state (I). The coherency tag value indicates a non-transactional (i.e., non-atomic execution) state in which operations are not guaranteed to be executing atomically. The transactional tag value indicates whether the line is in an atomic execution written (AW), atomic execution read (AR), or invalid state (I). The transactional tag value is used to indicate an atomic execution (also referred to as transactional) state in which operations are guaranteed to execute atomically. In some embodiments, a set of transactional tag values is stored in a register file so that multiple values can be read or modified in one cycle.

In some embodiments, there are two atomic execution bits in the transactional tag. In some embodiments, a three bit value is used to store the state. In this example, each line is shown to have a state. This example could also apply to an address where each address has a state. Although a line may be described, any of the examples described herein could also apply to an address.

In some embodiments, an atomic execution state is applied to a plurality of caches.

Figure 5A:
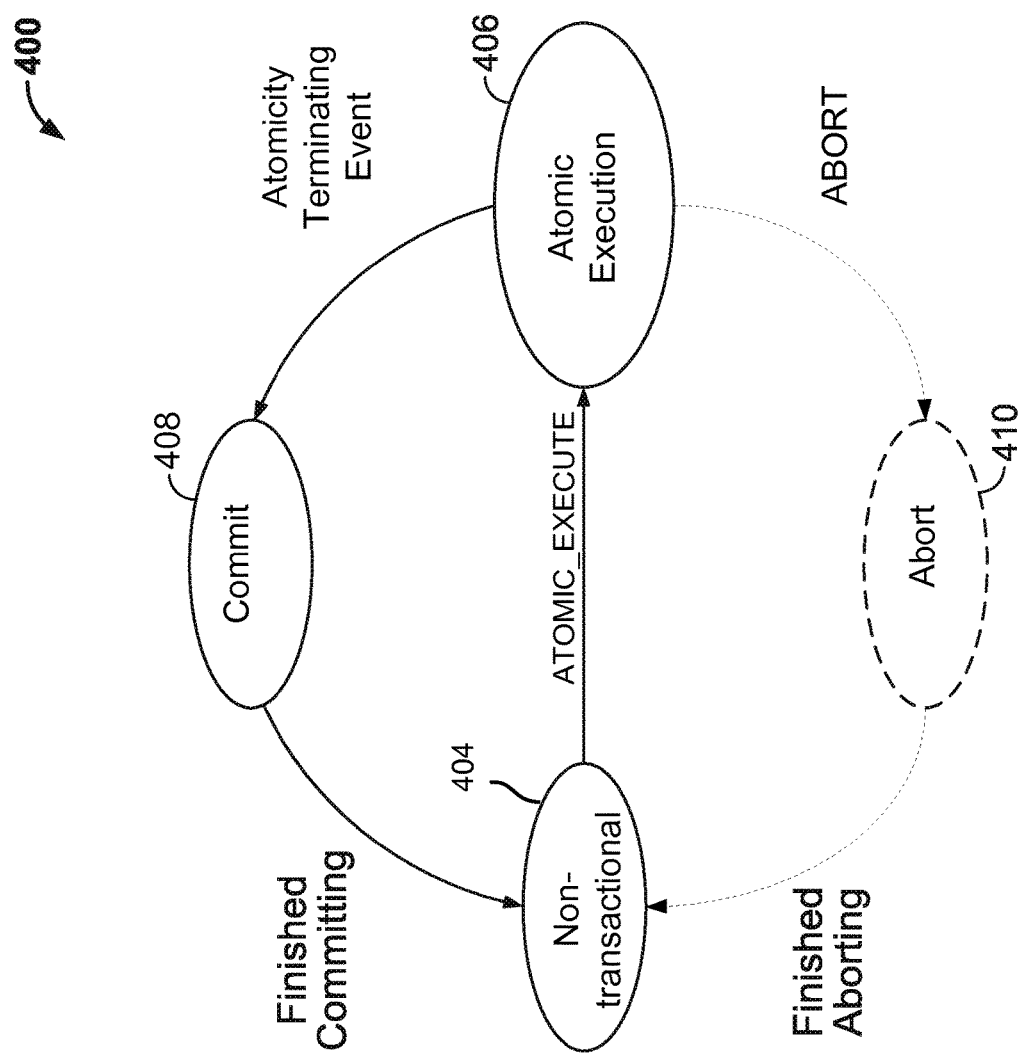
FIG. 5A is a state diagram illustrating an example of processor states in NSMA (Non-speculative Multi-address Atomicity) mode.

FIG. 5A is a state diagram illustrating an example of processor states in NSMA mode. In some embodiments, state diagram 400 is implemented on processors such as CPUs 104a or 106a illustrated in FIG. 1. In this example, state diagram 400 is shown to include non-transactional (i.e., non-atomic) state 404, atomic execution state 406, committing state 408, and optional aborting state 410. A set of instructions are provided, including, for example, "ATOMIC_EXECUTE," "COMMIT," and "ABORT," which are inserted into the program instructions, for example, by a compiler or the runtime environment such as a record/replay, environment.

Operations performed while the processor is in non-transactional mode do not access the cache. Examples of such operations include I/O operations and system calls. These operations are not transactional since they are not guaranteed to form an atomic transaction, and cannot be rolled back if they should fail. A processor in non-transactional mode 404 transitions to atomic execution mode 406 when a special instruction such as the "ATOMIC_EXECUTE" instruction is received. In some embodiments, the "ATOMIC_EXECUTE" instruction is invoked when atomic execution is desired, such as when a new thread is launched, or when an atomicity terminating event has been successfully handled and atomic execution should be restarted. While in atomic execution mode 406, operations may be performed on one or more lines or addresses in the cache and form an atomic transaction. At least some of these operations would access the cache. For example, an operation could include load (read) or store (write). An atomic transaction satisfies all ordering and visibility constraints of the system, which includes shared memory. The processor transitions to commit state 408 when an atomicity terminating event is received. In the commit state, memory operations are committed. The atomicity terminating event is sometimes triggered by a conflicting memory access by another processor and sometimes triggered by an explicit atomicity terminating instruction that is inserted by the compiler or the runtime environment (e.g., a "COMMIT" instruction that is invoked where a thread completes its operations or when conflicting access by another processor is detected). In some situations an atomicity terminating event can also be triggered by a cache eviction when it is determined that the cache is full.

When the cache is in atomic execution mode 406, the processor may enter an optional abort mode 410 when a software "ABORT" instruction is received. For example, an I/O operation may include an "ABORT" instruction to terminate atomicity. In the abort state, the original data in those lines or addresses can be retrieved from memory and uncommitted memory operations are reverted.

The example state diagram of FIG. 5A is applicable to NSMA since there is usually no speculation. Atomic execution in NSMA always succeeds and memory operations in an incidentally atomically executed sequence of code are always committed, unless there is an explicit software instruction to abort.

Figure 5B:
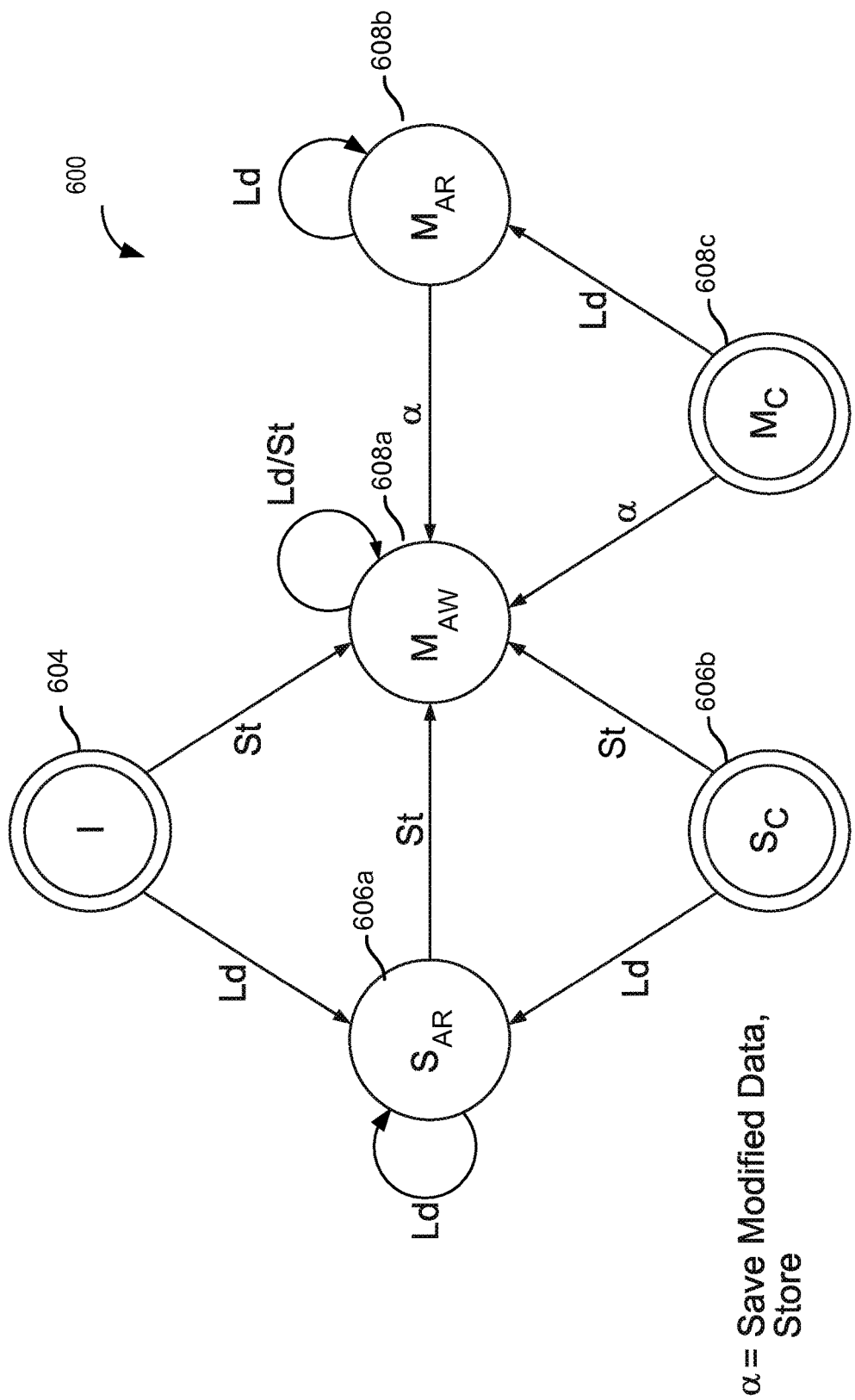
FIGS. 5B-5C are state diagrams illustrating various states of a cache line embodiment implementing NSMA mode.

FIG. 5B is a state diagram illustrating various states of a cache line embodiment in NSMA mode and the state transitions resulting from a load or a store. For example, the state diagram may apply to a line (or address) in cache 450. In this example, state diagram 600 is shown to include three non-transactional states and three atomic execute states. When the cache is in non-transactional mode, each line is in a non-transactional state. When the cache is in atomic execution mode, each line can be in an atomic execution state. The three non-transactional states are indicated by a double circle, and include invalid state 604, share state 606b, and modify state 608c. The subscript "C" on states 606b and 608c indicates that the line has been committed, and thus is not in an atomic execution state.

The three atomic execution states include share state 606a, modify state 608a, and modify state 608b. The subscript "AR" on share state 606a indicates that the line is in an atomic execution read state. The subscript "AW" on state 608a indicates that the line is in an atomic execution write state. The subscript "AR" on state 608b indicates that the line is in an atomic execution read state. For example, referring to FIG. 4, a line in modify atomic execution write state 608a would have a coherency tag value indicating that it is in a modify state and a transactional tag value indicating that it is in a an atomic execution write state.

In this example, a standard MSI coherency state diagram is modified to include atomic execution state transitions. Any cache coherency mechanism can be similarly modified in other embodiments. In this example, the state diagram transitions are described as follows:

A line in invalid state 604 transitions to share atomic execution read state 606a when a load is received for that line. When a store is received, the line transitions to modify atomic execution write state 608a.

A line in share atomic execution read state 606a remains in the same state when a load is received. When a store is received, the line transitions to modify atomic execution write state 608a.

A line in modify atomic execution write state 608a remains in the same state when a load or a store is received.

A line in share commit state 606b transitions to share atomic execution read state 606a when a load is received. When a store is received, the line transitions to modify atomic execution write state 608a.

A line in modify commit state 608c transitions to modify atomic execution read state 608b when a load is received. When a store is received, the line transitions to modify atomic execution write state 608a and the (original) modified data is saved, as more fully described below. In some embodiments, the modified data is written back to memory.

A line in modify atomic execution read state 608b remains in the same state when a load is received. When a store is received, the line transitions to modify atomic execution write state 608a and the (original) modified data is saved, as more fully described below. In some embodiments, the modified data is written back to memory.

The (original) modified data is saved when there may be a need to retain the modified data. For example, when a store is performed on a line in modify commit state 608c, the line transitions to modify atomic execution write state 608a. The modified data stored in the line is saved before the store is performed. In the event that an abort occurs, the line transitions to invalid state 604 and the modified data can be retrieved from memory. In some embodiments, the modified data is saved to a lower level of the cache hierarchy rather than memory. In some embodiments, the modified data is stored in a local shadow location.

In some embodiments, transitioning the state of the line includes marking the address (or line) in the cache as being in the new state.

Figure 5C:
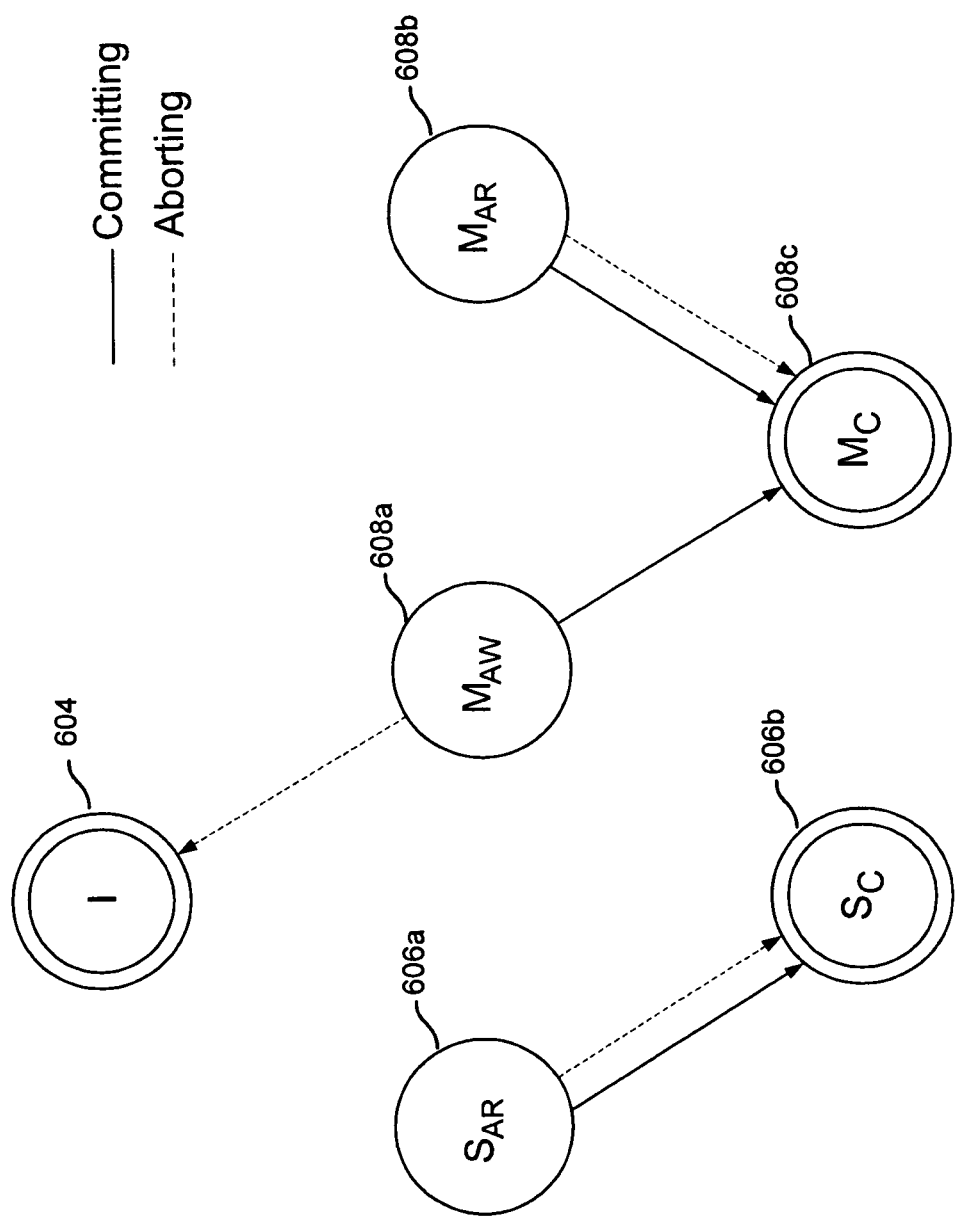

FIG. 5C is an example state diagram illustrating the states of a cache line embodiment in NSMA mode and the state transitions resulting from committing or aborting. For example, the state diagram may apply to a line (or address) in cache 450. In this example, the cache is in atomic execution mode and the line is in one of three atomic execution states: share atomic execution read state 606a, modify atomic execution write state 608a, or modify atomic execution read state 608b. When committing or aborting, the line transitions to one of three non-transactional states: invalid state 604, share commit state 606b, or modify commit state 608c.

When committing, share atomic execution read state 606a transitions to share commit state 606b. Modify atomic execution write state 608a and modify atomic execution read state 608b transition to modify commit state 608c. When aborting, share atomic execution read state 606a transitions to share commit state 606b. Modify atomic execution write state 608a transitions to invalid state 604. Modify atomic execution read state 608b transitions to modify commit state 608c.

When the cache is in non-transactional mode 404, each line is in one of non-transactional states 604, 606b, and 608c and the state of each line can be observed. When the cache is in atomic execution mode 406, if an atomic execution line is disturbed, an abort occurs, and the cache returns to non-transactional mode 404. When a non-atomic execution line is disturbed while in atomic execution mode, an abort will not necessarily occur. In some embodiments, a cache line can only be in an atomic execution state while in atomic execution mode. Each line in an atomic execution state returns to one of states 604, 606b, and 608c, depending on which atomic execution state 606a, 608a, and 608b, the line was in prior to the abort.

Referring to FIG. 5A, in NSMA mode, the atomicity terminating event that causes the processor to leave atomic execution state 406 and into commit state 408 is sometimes detected by observing the cache line states shown in FIG. 5C. When a processor is in atomic execution state, the cache line(s) used by the processor correspondingly would occupy an atomic state such as $S_{AR}$, $M_{AW}$, or $M_{AR}$. If another processor attempts to store data to the cache line, then commit occurs and the memory states in the cache line are committed (and the cache line enters into $S_C$ or $M_C$ state) and the processor enters into commit state. Additionally, if another processor attempts to load from the cache line and the cache line is in $M_{AW}$ state, then commit occurs and the memory states in the cache line become committed (and the cache line enters into $S_C$ or $M_C$ state) and the processor enters into commit state.

Figure 6A:
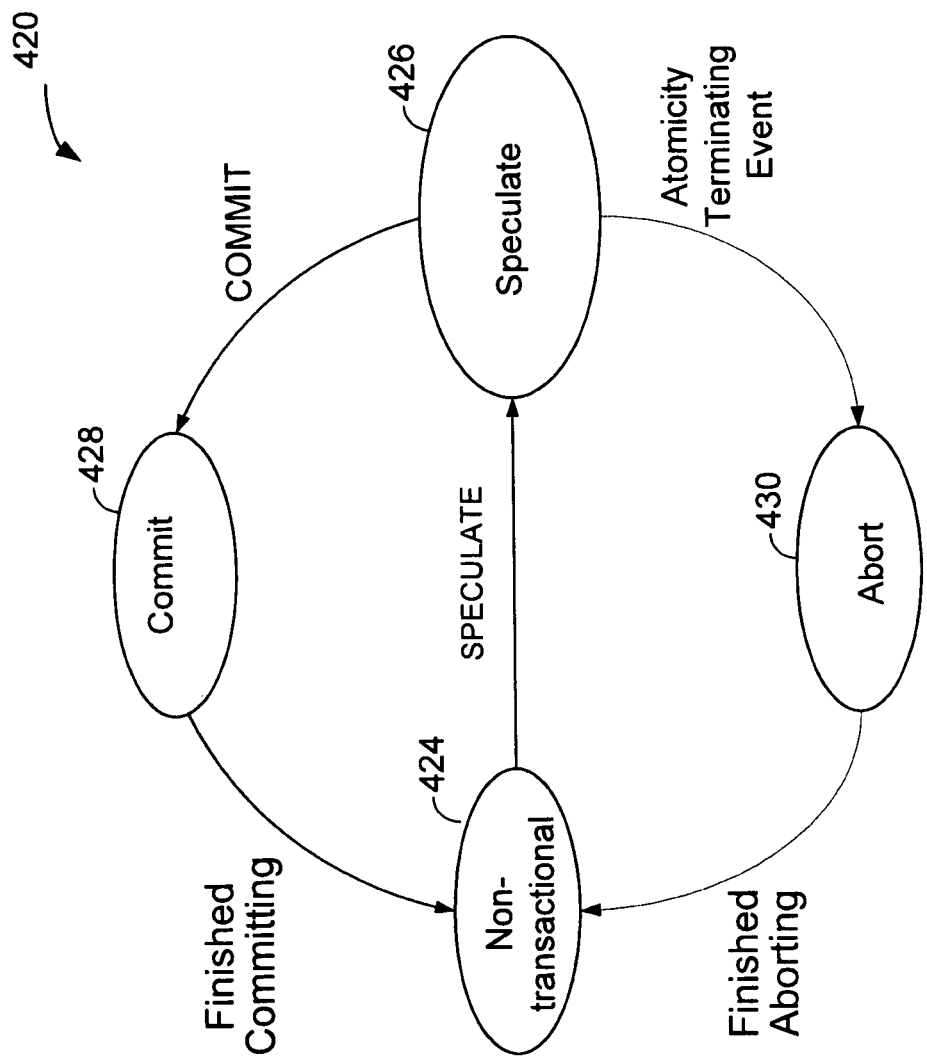
FIG. 6A is a state diagram illustrating an example of processor states in SMA (Speculative Multi-address Atomicity) mode.

FIG. 6A is an embodiment of a state diagram illustrating an example of processor states in SMA mode. In some embodiments, state diagram 420 is implemented on processors such as CPUs 104a or 106a illustrated in FIG. 1. In this example, state diagram 420 is similar to 400 except that instead of the atomic execution state, a speculative state 426 is included. The processor transitions from non-transactional state 424 to speculative state 426 when a special instruction such as "SPECULATE" is received. The "SPECULATE" instruction is issued when the processor is ready to initiate speculative execution. When in speculative state 426, speculative operations may be performed atomically on one or more lines or addresses in the cache. For example, an operation could include load (read) or store (write). Speculative operations are memory operations performed on the cache, but are not necessarily later committed. For example, while in speculative state, an atomicity terminating event may occur due to conflicting memory access by another processor or a software "ABORT" instruction, in which case the abort state 430 is entered, where the line is invalidated, and the original value of the line retrieved from memory. The processor transitions from speculative mode to commit state 428 when a "COMMIT" instruction is received to commit the speculative operations. As discussed in greater detail below, the "COMMIT" instruction in SMA mode may be inserted by the compiler or the runtime environment at selected locations in execution.

Figure 6B:
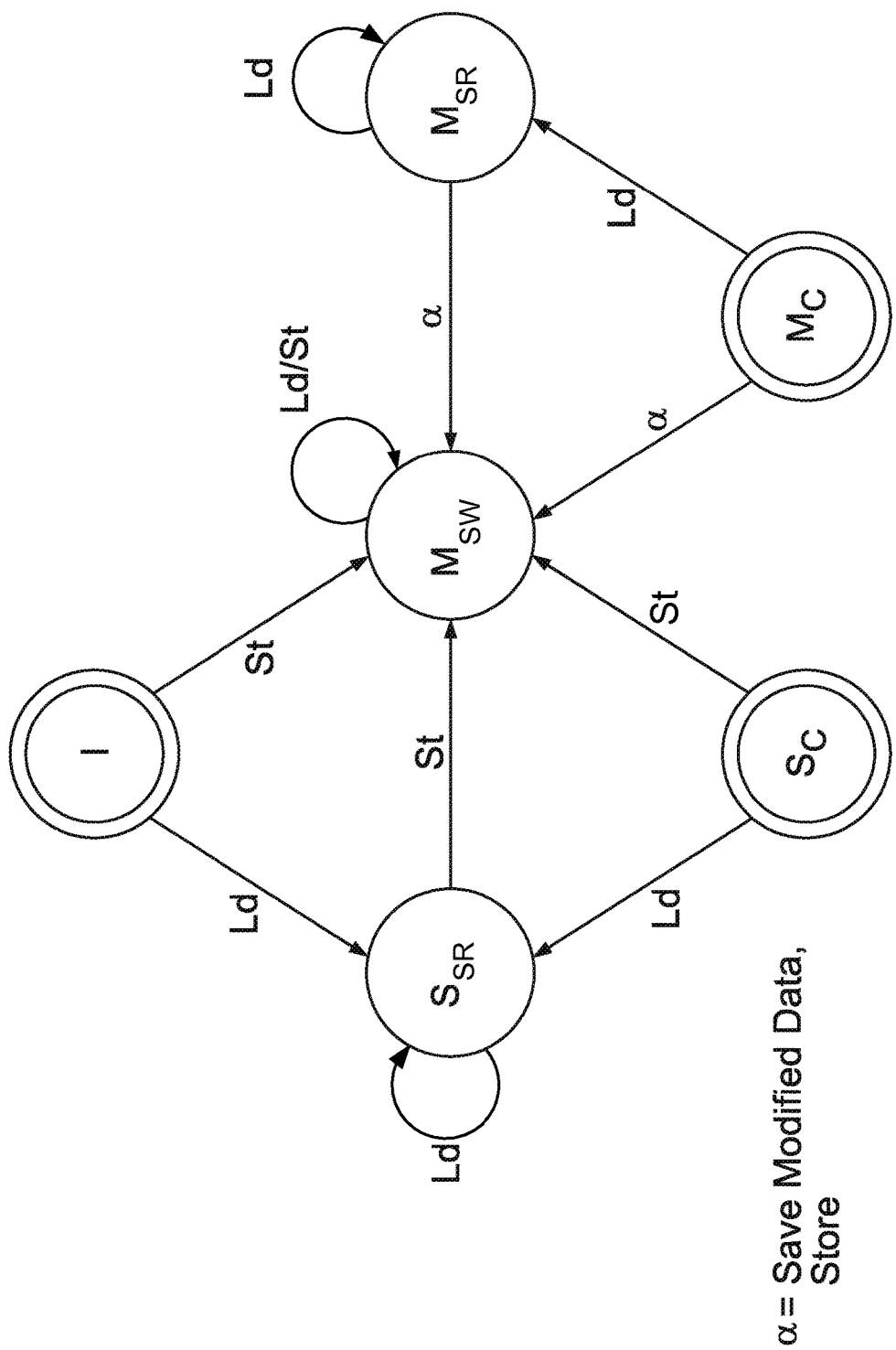
FIGS. 6B and 6C are state diagrams illustrating various states of a cache line embodiment implementing SMA mode.
Figure 6C:
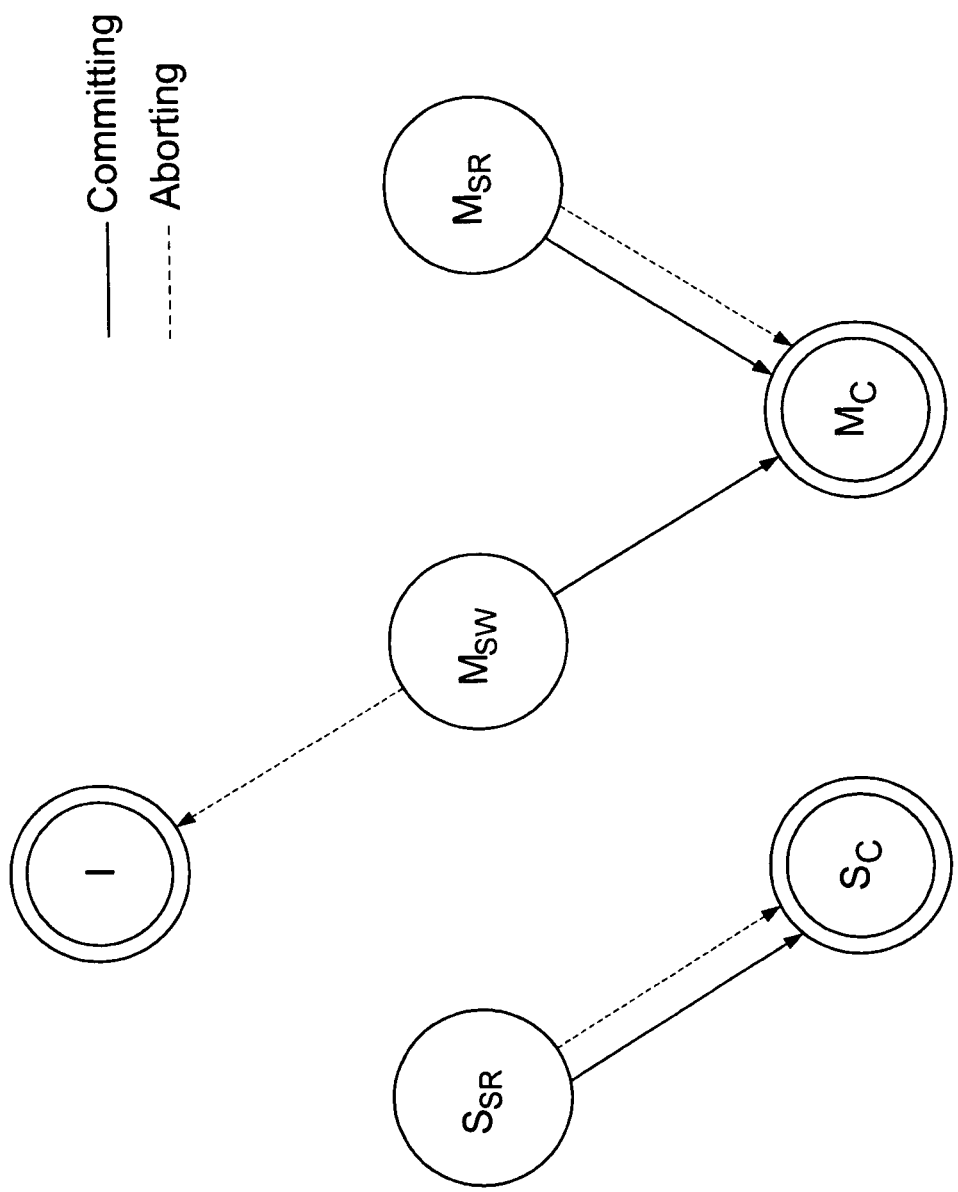

FIGS. 6B and 6C are state diagrams for a cache line embodiment used to implement SMA mode. The states are similar to those shown in FIGS. 5B-5C, except that different subscripts are used to indicate speculative states. Compare FIGS. 6B and 6C with FIGS. 5B and 5C. $S_{SR}$ (share speculative read state) is used instead of $S_{AR}$, $M_{SR}$ (modify speculative read state) instead of $M_{AR}$, and $M_{SW}$ (modify speculative written) instead of $M_{AW}$.

Referring to FIG. 6A, in SMA mode, the atomicity terminating event that causes the processor to leave speculative state 426 and into abort state 430 is sometimes detected by observing the cache line states shown in FIG. 6C. When a processor is in speculative state, the cache line(s) used by the processor correspondingly would occupy a speculative state such as $S_{SR}$, $M_{SW}$, or $M_{SR}$. If another processor attempts to store data to the cache line, then abort occurs, the processor enters into abort state and the memory state of the cache line transitions to a non-speculative state. A cache line in $S_{SR}$, $M_{SW}$, or $M_{SR}$ state would enter into $S_C$, I, or $M_C$ state respectively as shown in FIG. 6C. Additionally, if another processor attempts to load from the cache line and the cache line is in $M_{SW}$ state, then abort also occurs. The processor enters into abort state, the memory states in the cache line are reverted, and the cache line enters into I state.

Figure 7A:
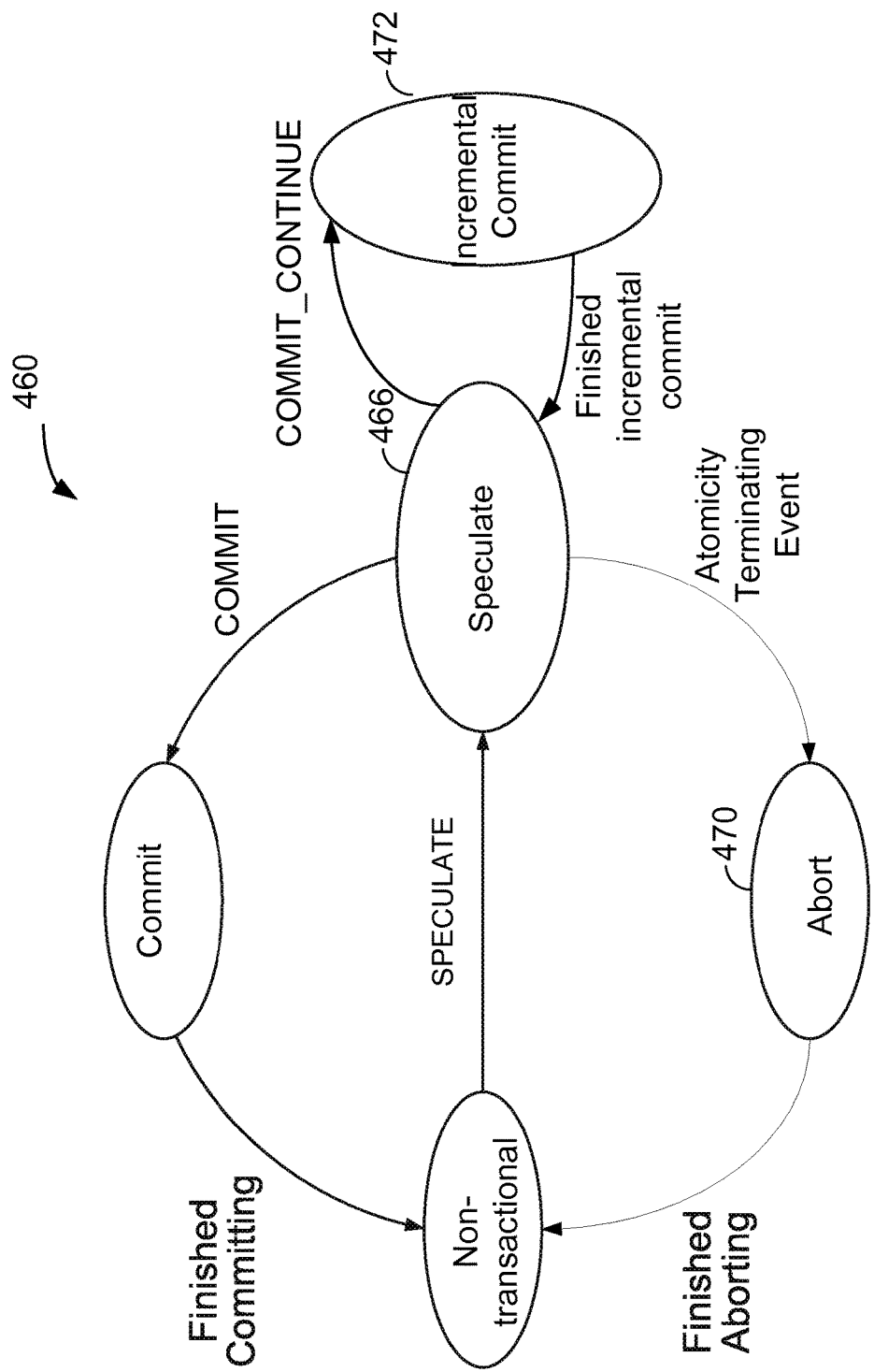
FIG. 7A is a state diagram illustrating an example of processor states in ISMA (Incrementally Speculative Multi-address Atomicity) mode.

FIG. 7A is a state diagram illustrating an example of processor states in ISMA mode. The states in state diagram 460 and the entry/exit of the states are similar to 420 of FIG. 6A, but with the addition of an incremental commit state 472. The processor enters into the incremental commit state when a "COMMIT_AND_CONTINUE" instruction is received. In this state, memory operations since last time any data was committed become committed, although the processor continues to execute speculatively. The processor exits the Incremental Commit state when memory operations eligible for incremental commit are committed.

Figure 7B:
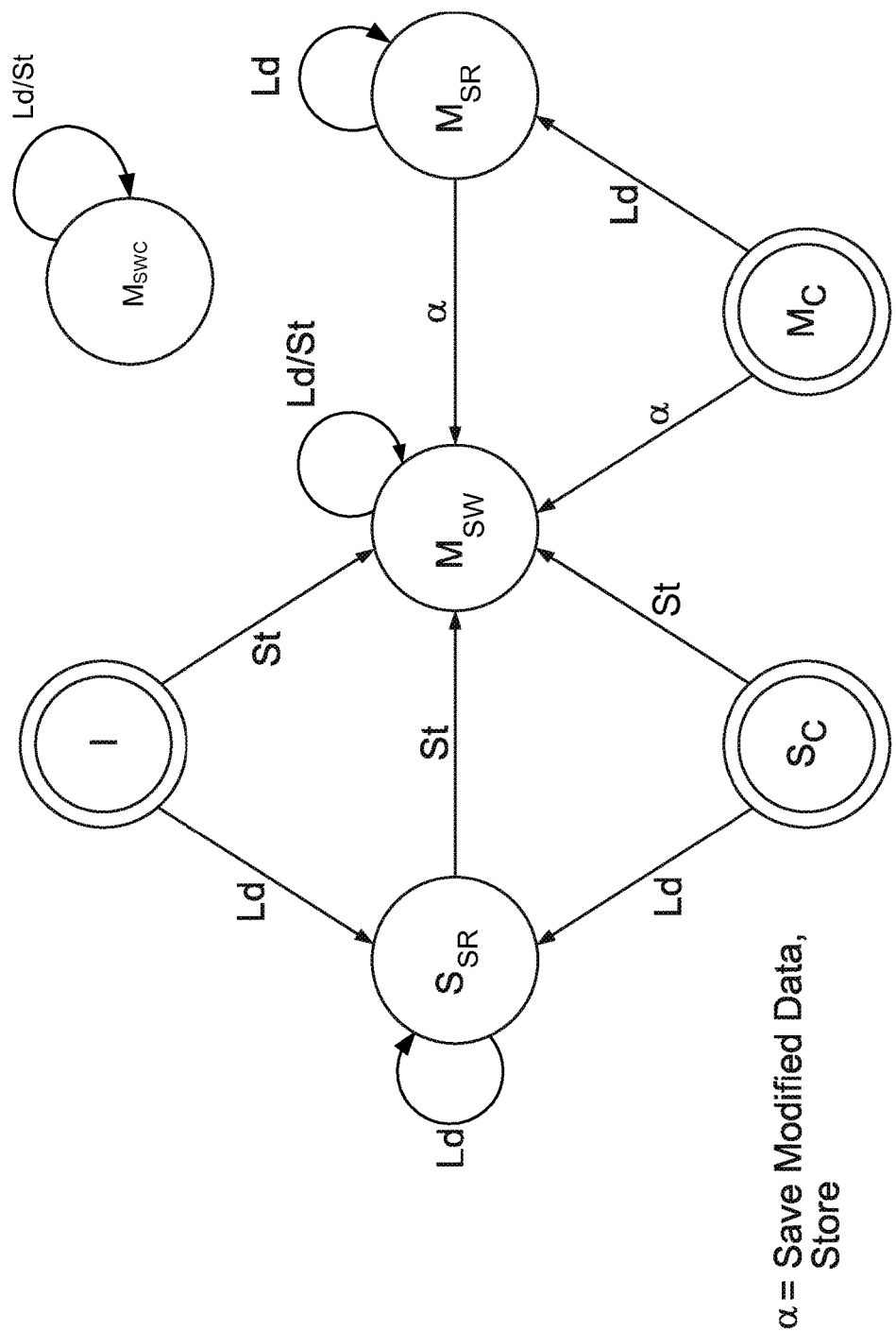
FIGS. 7B and 7C are state diagrams illustrating various states of a cache line embodiment implementing ISMA mode.

FIG. 7B is a state diagram illustrating various states of a cache line embodiment in ISMA mode and the state transitions resulting from a load or a store. The states are similar to the ones shown in FIG. 6B, except that there is an additional state $M_{SWC}$ (Modify Speculative Written Committed) that is not reachable from other states with load/store operations.

Figure 7C:
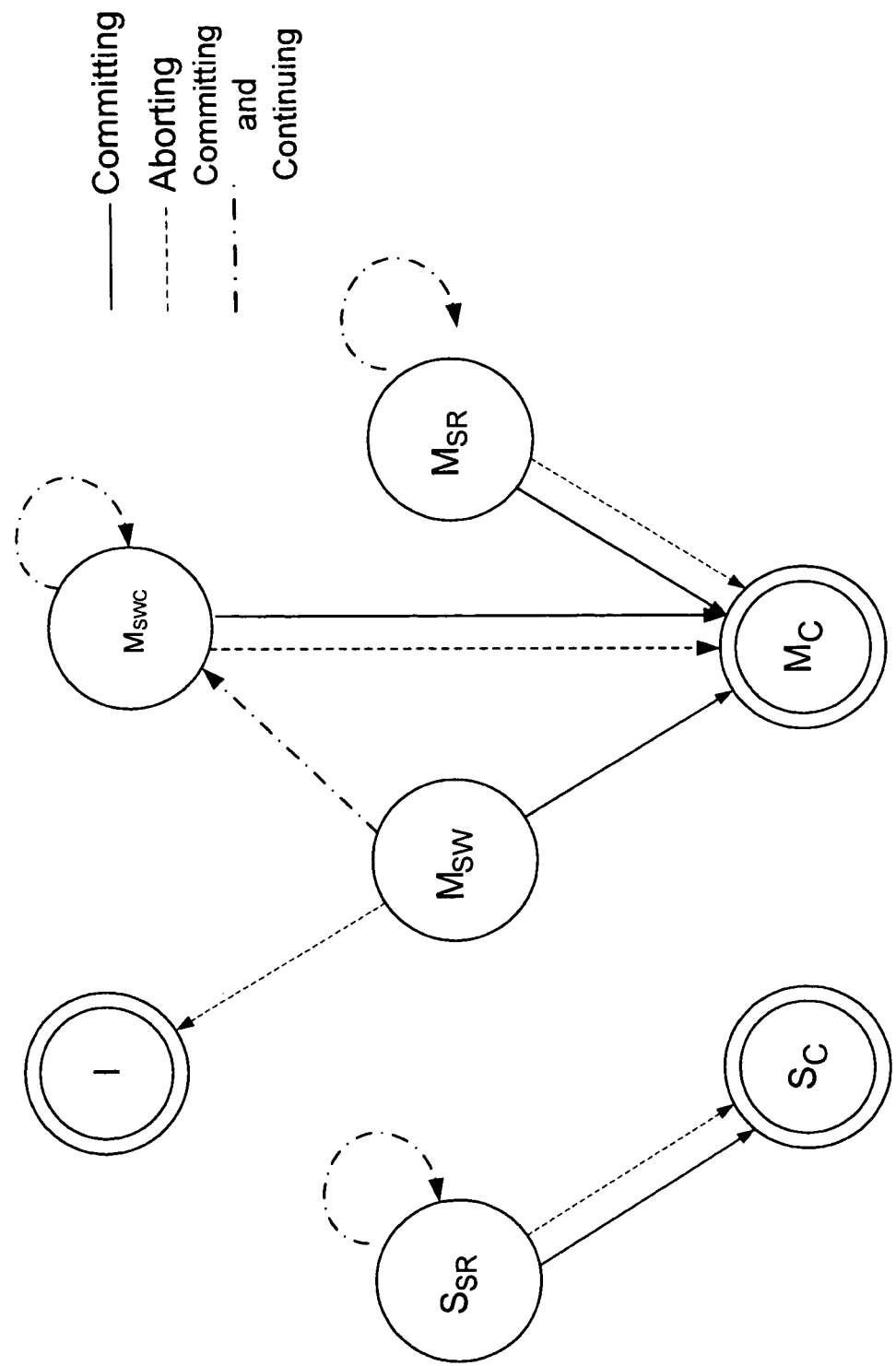

FIG. 7C is an example state diagram illustrating the states of a cache line embodiment in ISMA mode and the state transitions resulting from committing, aborting, or commit_and_continuing. In this diagram, state $M_{SWC}$ is entered from $M_{SW}$ upon committing. Once in $M_{SWC}$ state, the cache line remains in the same state until either commit or abort occurs.

Referring to FIG. 7A, in ISMA mode, the atomicity terminating event that causes the processor to leave speculative state 466 and into abort state 470 is sometimes detected by observing the cache line states shown in FIG. 7C. When a processor is in speculative state, the cache line(s) used by the processor correspondingly would occupy a speculative state such as $S_{SR}$, $M_{SW}$, $M_{SR}$, or $M_{SWC}$. If another processor attempts to store data to the cache line, then abort occurs, the processor enters into abort state and the memory states in the cache line transition to non-speculative state. A cache line in $S_{SR}$, $M_{SW}$, $M_{SWC}$, or $M_{SR}$ state would enter into $S_C$, I, $M_C$ or $M_C$ state, respectively as shown in FIG. 7C. Additionally, if another processor attempts to load from the cache line and the cache line is in $M_{SW}$ or $M_{SWC}$ state, then abort also occurs. The processor enters into abort state, the memory states in the cache line are reverted, and the cache line enters into I state.

By following the cache coherency protocol described above, state transitions of the processor/cache line can be determined by observation of current state (in particular the transactional tag values associated with the cache lines) and the incoming request.

Two or more of NSMA, ISMA, and SMA modes can be implemented together on the same system. In some embodiments, one of the modes is in use at one time. In some embodiments, two or more modes can be in use simultaneously.

Figure 8:
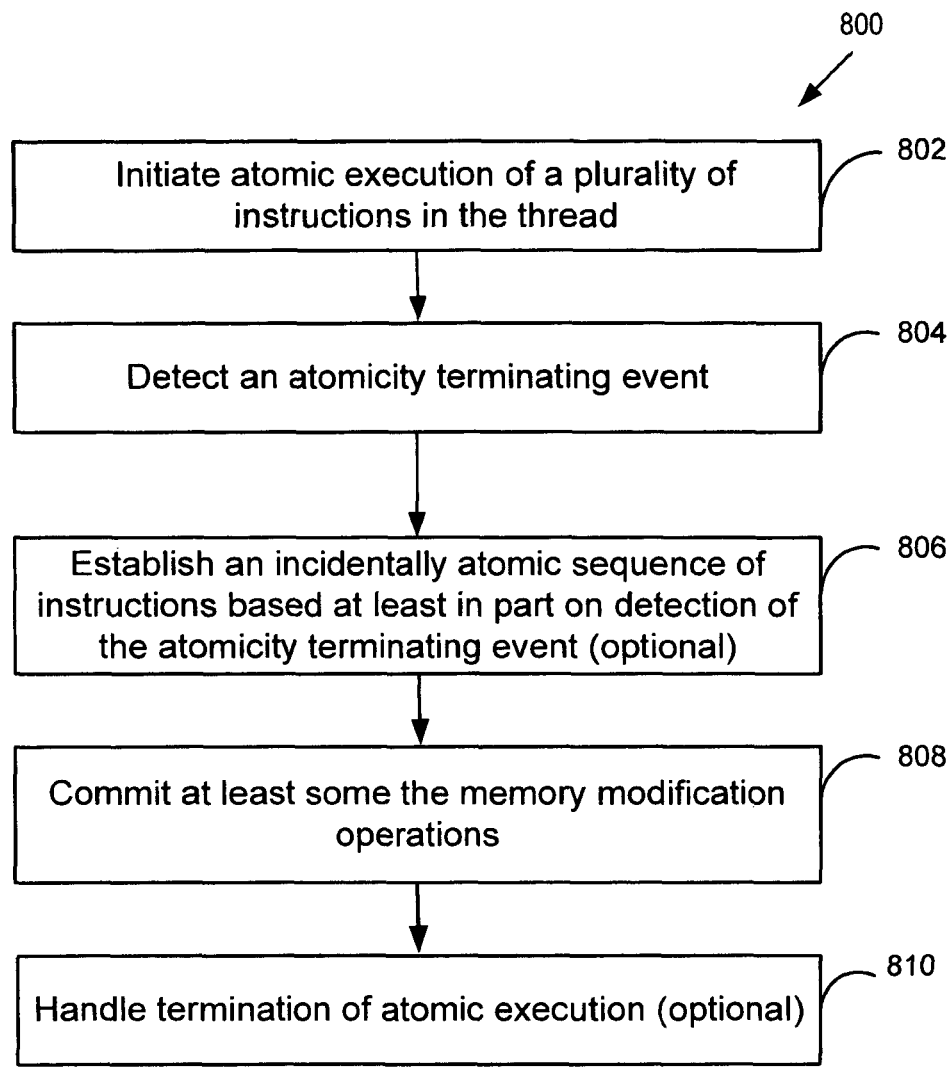
FIG. 8 is a flowchart illustrating an embodiment of a commit process applicable to both the NSMA and the ISMA techniques.

FIG. 8 is a flowchart illustrating an embodiment of a commit process applicable to both the NSMA and the ISMA techniques. Process 800 may be implemented on a system such as system 100. Process 800 begins at 802, where the atomic execution of instruction units in a thread is initiated, starting with a beginning instruction unit. In some embodiments, the compiler or the runtime environment inserts a specific instruction to start atomic execution at a selected location. For example, a special instruction of "ATOMIC_EXECUTE" is inserted in the case of an implementation of the NSMA mode and a special instruction of "SPECULATE" is inserted in the case of an implementation of the ISMA mode. As described above, the instruction units are not programmatically specified to be executed atomically and would exhibit non-deterministic atomicity at runtime. At least some of the instruction units include memory modification operations.

The instruction units are executed atomically until at 804, an atomicity terminating event is detected. The atomicity terminating event can be triggered by a conflicting memory access by another processor or a special instruction such as "ABORT" or "COMMIT."

At 806, an incidentally atomic sequence of instructions is optionally established based at least in part on the detection of the atomicity terminating event. At 808, at least some of the memory modification operations are committed. In the case of NSMA, all memory modification operations that have been carried out since the atomic operation was initiated are committed. In the case of ISMA, memory modification operations are committed incrementally. At 810, optional handler code is executed to handle the termination of atomic execution. For example, in some embodiments information pertaining to the incidentally atomic sequence of instruction units is recorded so that the sequence may be later replayed.

FIG. 9 is an example sequence of instructions illustrating the operations of NSMA. In NSMA, the processor is allowed to execute atomically for as long as possible, until an atomicity terminating event is detected or a software "ABORT" instruction is received. In the event that an atomicity terminating event is received, the sequence of instructions that has been atomically executed is deemed successful, thus all memory operations in the sequence are committed. In the event that an "ABORT" instruction causes the atomic execution to terminate, the execution is deemed to have failed, memory operations are reverted (i.e., the original data in the cache lines are restored and all uncommitted memory operations are lost), and the sequence is re-executed.

In this example, an instruction "ATOMIC_EXECUTE" is inserted by the compiler or the runtime environment to initiate atomic execution of instructions beginning with "ld" with program count value 106. Instructions execute atomically until after "shl" at counter 3497 has been executed and an atomicity terminating event is detected. As used hereinafter the notation shl(3497) denotes instruction shl at program counter value 3497. A special trap handler is invoked to handle this situation. The trap handler may be implemented in software as a set of instructions, in hardware as circuitry, or a combination. In the example shown, the trap handler is implemented as a sequence of software instructions stored in a memory such as 110 of system 100 and invoked by a processor to handle the situation. In NSMA, upon detecting an atomicity terminating event, the atomic execution of instructions thus far (in this case instructions between 106-3497) is deemed a success. Memory operations are committed, appropriate memory markers in the cache lines are cleared, and information about this atomic execution sequence is recorded so the execution can be replayed. The handler further invokes another "ATOMIC_EXECUTE" instruction to initiate another atomic execution sequence, and the code returns. Instructions starting with shr(3498) are executed atomically, until abort(5651) is invoked. When an "ABORT" instruction is invoked, the atomic execution sequence starting after the last time "ATOMIC_EXECUTE" was invoked is deemed to have failed, and a trap handler is invoked to revert memory operations that occurred between program counter values of 3498-5650. "ATOMIC_EXECUTE" is invoked again to re-initiate atomic execution, and the program returns to re-execute shr(3498) and may be repeated until the sequence of instructions is successfully executed.

FIG. 10 is an example sequence of instructions illustrating the operations of ISMA. In ISMA, instructions are executed speculatively and are committed incrementally. When atomicity is terminated, whether by an atomicity terminating event or by a forced software "ABORT" instruction, only the uncommitted portion is reverted back.

In this example, atomic execution is initiated by the "SPECULATE" instruction inserted by the compiler or the runtime environment. Instructions beginning with "ld" at program counter 301 are executed atomically. A "COMMIT_AND_CONTINUE" instruction is inserted by the compiler or the runtime environment at 389. The "COMMIT_AND_CONTINUE" instruction invokes an ISMA trap handler that commits what has been atomically executed so far, clears the memory markers, optionally records information about the atomic execution, and returns. At this point, atomic execution has not been terminated. More instructions are executed and the compiler or runtime environment can insert additional "COMMIT_AND_CONTINUE" instructions where it is appropriate. After shl(415) has been executed, an atomicity terminating event is detected. Instructions shl(390) to shl(415) have not been committed, and the atomic execution of these instructions is deemed to have failed. An ISMA trap handler that handles the failure condition is invoked, which reverts memory operations carried out between shl (390) to shl (415), executes "SPECULATE" again to re-initiate atomic execution starting with shl(390), and returns to regular program execution. Atomic execution resumes with shl(390) and continues until an atomicity terminating event is detected or a software abort is invoked.

FIG. 11 is an example sequence of instructions illustrating the operations of SMA. In SMA, as in ISMA, the instructions are executed speculatively, although there is no incremental commit. The runtime environment makes a guess (G) as to how many instructions should be executed speculatively and atomically prior to committing. The value of G is determined empirically. If the sequence is successfully executed, memory operations are committed, and the termination of atomic execution is handled. If, however, the atomic execution terminates before G instructions are successfully executed, the instructions are reverted and a new, smaller guess is made. The process is repeated until all G instructions are successfully executed atomically.

In the example shown, the "SPECULATE" instruction inserted by the compiler or runtime environment is initially set to speculatively execute 1000 instructions atomically (i.e., the initial G is set to 1000). An atomicity terminating event is detected before all 1000 instructions are executed. An SMA trap handler is invoked to handle this failure condition, where memory operations between ld(301)-st (880) are reverted, and the "SPECULATE" instruction reduces G to a new guess of 500 instructions. The handler code returns and instructions starting at ld(301) are once again executed atomically. This time, 500 instructions are successfully executed atomically without any interruption. Thus, a trap handler is invoked to handle the success condition, where the memory operations are committed, the markers are cleared, and the information about the atomic execution recorded.

In some embodiments of the SMA implementation the guess G is adjusted based on the execution of more than one thread. For example, if the initial guess G is set to 1000, and one thread managed to atomically executing 750 instructions before it is interrupted, another 600, and another 450, the guess may be adjusted to 400 to ensure that all the threads can successfully complete atomic execution of 400 instructions when the instructions are re-executed. Further, if all the threads can always complete G instructions before atomicity is interrupted, G may be re-adjusted to a greater value to include more instructions in each attempt. In some embodiments, each thread has its own corresponding G that is adjusted to best suit the particular runtime conditions for that thread.

In the examples shown above, special initiating instructions such as "SPECULATE" and "ATOMIC_EXECUTE" are placed by the compiler or the runtime environment. The locations of the special instructions depend on implementation. In some embodiments, the special instructions are placed every X instructions or instruction units (X being a positive integer). In some embodiments, the special initialization instructions are placed at safepoints where the execution states of the CPU is known.

Figure 12:
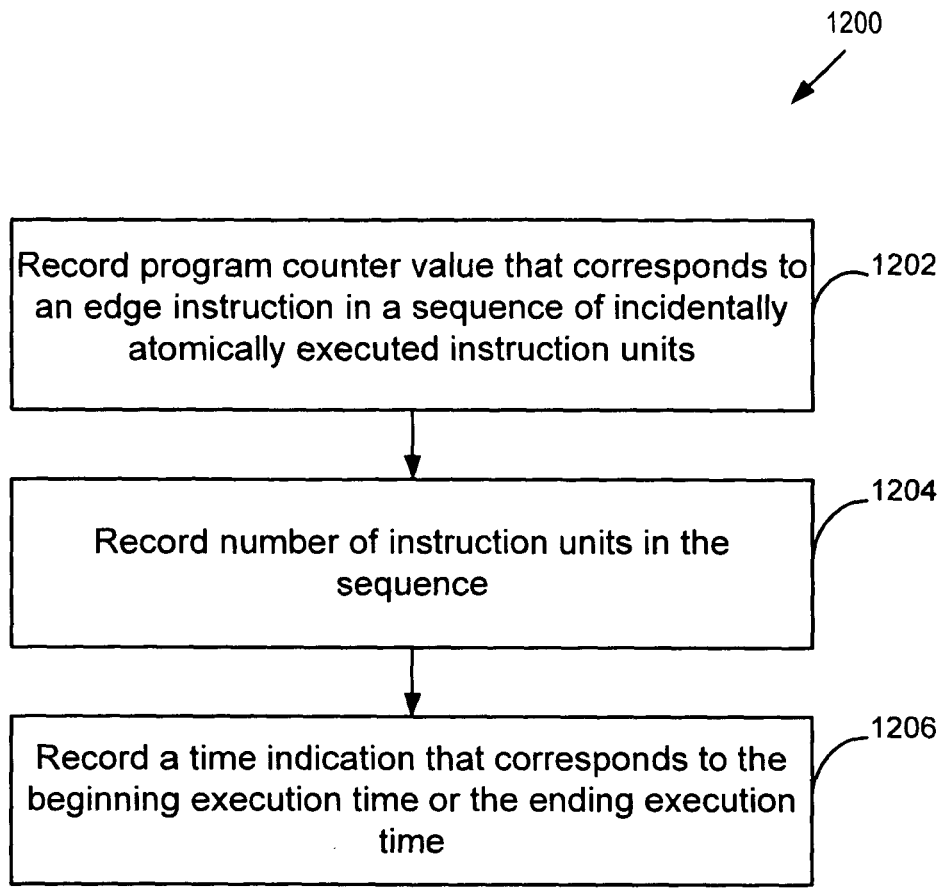
FIG. 12 is a flowchart illustrating an embodiment of a process for recording execution information associated with an incidentally atomically executed sequence of instruction units.

In some embodiment, the atomically executed code sequences are recorded so they can be replayed. FIG. 12 is a flowchart illustrating an embodiment of a process for recording execution information associated with an incidentally atomically executed sequence of instruction units. Process 1200 may be implemented on a system such as system 100. In some implementations of process 300, process 1200 is included as a part of 308 (performing an end of range action). In some implementations of process 800, process 1200 is included as a part of 810 (handling termination of atomic execution). In this example, it is assumed that multiple threads are concurrently executing on multiple CPUs and an atomicity terminating event has already been detected. In this example, the process includes 1202, recording a program counter value that corresponds to an edge instruction of the sequence of incidentally atomically executed instruction units the beginning instruction or the ending instruction of the range of instruction units). It also includes 1204, recording the number of instruction units in the sequence, and 1206, recording a time indication that corresponds to the beginning time when the sequence of instruction units began to execute or the ending time when the sequence of instruction units finished execution. In some embodiments, the time indication includes a global timestamp. In some implementations, the global timestamp is obtained from a global clock that is shared among multiple CPUs; in some implementations, the global timestamp is obtained by the CPU's own clock that is synchronized with a global clock. In some embodiments, the execution information includes global system sequencing information such a global sequence that is globally visible and globally monotonically increasing. Thus, the recording process of 1200 allows a series of atomically executed units to be played back deterministically.

In some embodiments, the tasks associated with handling the atomicity terminating event are distributed differently to various code components. For example, the memory markers may be cleared within the "ATOMIC_EXECUTE" operation in some embodiments, or within the "COMMIT" operation in some other embodiments.

Figure 13:
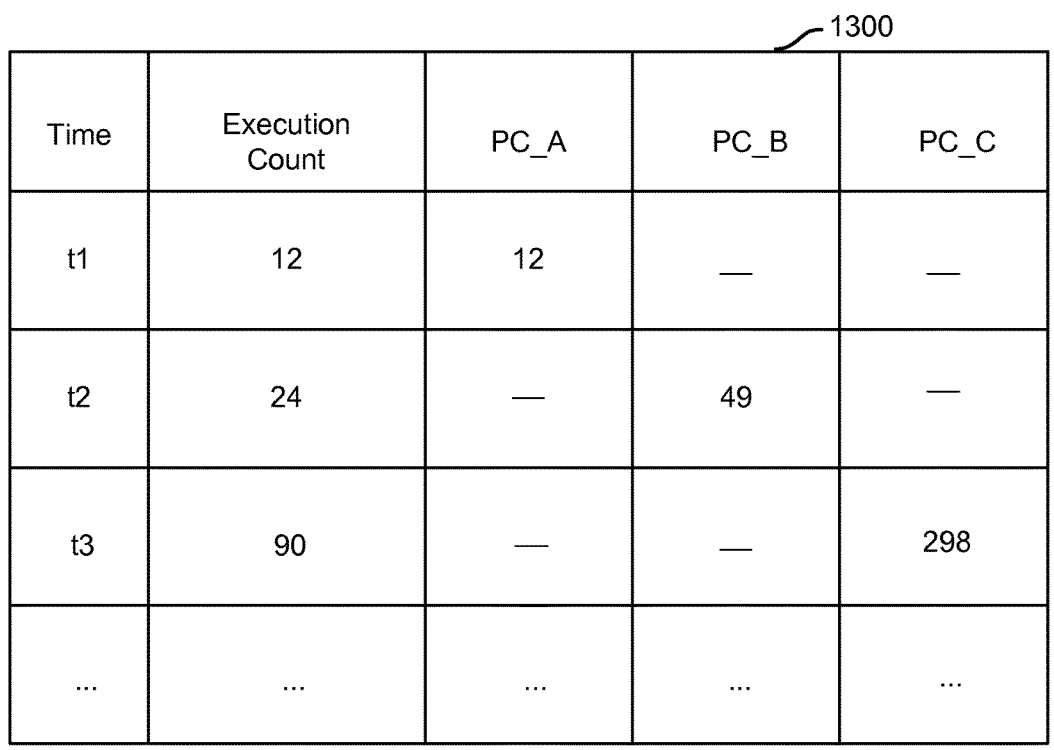
FIG. 13 is a diagram illustrating an example of an execution record.

FIG. 13 is a diagram illustrating an example of an execution record. This example includes some of the instruction unit sequences that are incidentally executed by threads A, B, and C shown in FIG. 2. It is assumed that the time at the beginning of the program's execution (t0) is known. In table 1300, each row corresponds to a section of atomically executed code. An entry includes the time at which the atomicity terminating event is detected. In some embodiments, time is expressed using the clock cycle of a global clock. The entry further includes an instruction unit count that counts the number of instruction units executed either since the beginning of the program if the entry corresponds to the first sequence, or since the last time an atomicity terminating event was detected if the entry corresponds to a later sequence. In this example, an instruction unit corresponds to an instruction, and the instruction unit count counts the number of instructions that were executed. Different instruction units used in other embodiments are discussed below. The entry further includes the program counter value of the CPU at the time the atomicity terminating event was detected. In the example shown, entries for multiple CPUs are recorded. Based on the entry records, code can be replayed deterministically.

Other entry formats are sometimes used in other embodiments. For example, rather than recording time, instruction unit count, and program counter value at the end of an atomically executed code section, corresponding values at the beginning of an atomically executed code section may be recorded and used for replay.

The examples shown above use instructions as instruction units for the number of executions. In some embodiments, other instruction units such as branch instructions or safepoints are used. Safepoints are locations in the code sequence where the CPU's execution states are known. The thread is guaranteed to execute atomically between two consecutive safepoints. For example, in a managed runtime environment such as a Java virtual machine, there is a safepoint on the edge of each bytecode. Each bytecode may include multiple instructions but is guaranteed to execute atomically. If an atomicity terminating event were detected between two safepoints, the processor would roll back its execution to the first safepoint, and commit changes up to that safepoint.

Recording incidentally atomic sequences of instruction units for replay has been described. The technique is generally applicable to any operating system, Java virtual machine environment, Microsoft .NET environment, or any other managed runtime environments such as application level virtual machines.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
 a processor configured to:
  insert an initialization instruction that is used to facilitate detection of runtime incidental atomicity, wherein the initialization instruction is inserted at a safepoint where an execution state of a central processing unit is known, and wherein the initialization instruction comprises an instruction to speculatively execute a particular number of instructions;
  initiate speculative execution of a plurality of instruction units in a thread, starting with a beginning instruction unit in the plurality of instruction units that immediately follows the inserted initialization instruction, wherein:
   at least some of the plurality of instruction units correspond to predetermined safepoints associated with known central processing unit execution states, wherein the predetermined safepoints were determined prior to initiation of speculative execution, and wherein thread execution between two consecutive predetermined safepoints is guaranteed to be atomic;
   at least one of the plurality of instruction units comprises a plurality of machine instructions that emulates one or more virtual instructions;
   thread execution of each of the plurality of instruction units is guaranteed to be atomic; and
   the plurality of instruction units is not programmatically specified to be executed atomically together; and
  in response to a determination that the particular number of instructions are successfully executed atomically without interruption, record information associated with the atomic execution, including establishing an incidentally atomic sequence of instruction units, wherein the incidentally atomic sequence of instruction units comprises a sequence of instruction units that was incidentally atomically executed, and wherein establishing the incidentally atomic sequence of instruction units includes:
   determining an ending instruction unit, and wherein the incidentally atomic sequence of instruction units corresponds to a sequence of executed instruction units starting at the beginning instruction unit that immediately followed the inserted initialization instruction and ending at the determined ending instruction unit; and
 a memory coupled to the processor, configured to provide the processor with the plurality of instruction units.

2. The system of claim 1, wherein the memory is a main memory and the system further comprising a cache memory used by the thread during execution of the plurality of instruction units, and the processor is further configured to mark a memory marker that is associated with the cache memory.

3. The system of claim 2, wherein in response to the determination that the particular number of instructions is successfully executed atomically without interruption, the memory marker is reset.

4. The system of claim 2, wherein the memory marker includes a tag value associated with a cache line.

5. The system of claim 2, wherein the memory marker is marked by a load operation or a store operation.

6. The system of claim 1, wherein the plurality of instruction units includes a plurality of instructions.

7. The system of claim 1, wherein at least some of the plurality of instruction units are memory modification operations.

8. The system of claim 1, wherein the memory is a main memory and the system further comprising a cache memory, and data in the cache memory is committed in response to the determination that the particular number of instructions are successfully executed atomically without interruption.

9. The system of claim 1, wherein the processor is further configured to record execution information comprising a program counter value.

10. The system of claim 1, wherein the processor is further configured to record execution information comprising a number of instruction units in the incidentally atomic sequence of instruction units.

11. The system of claim 1, wherein the processor is further configured to record execution information comprising global sequencing information.

12. The system of claim 1, wherein the processor is further configured to record execution information comprising a time indication.

13. The system of claim 1, wherein the beginning instruction unit corresponds to a beginning safepoint and the ending instruction unit corresponds to an ending safepoint.

14. The system of claim 1, wherein the processor is further configured to replay the incidentally atomic sequence of instruction units based on recorded execution information.

15. The system of claim 1, wherein the processor is further configured to invoke a trap handler, wherein the trap handler is configured to invoke a second initialization instruction to initiate subsequent speculative execution of a second plurality of instruction units.

16. The system of claim 1 wherein the particular number of instructions to be speculatively executed comprises an estimate of how many instructions would be executed speculatively prior to committing.

17. The system of claim 1 wherein the particular number of instructions to be speculatively executed is determined empirically.

18. The system of claim 1 wherein the particular number of instructions to be speculatively executed is determined based on a previously observed number of instructions that were successfully executed without interruption.

19. A method comprising:
  inserting an initialization instruction that is used to facilitate detection of runtime incidental atomicity, wherein the initialization instruction is inserted at a safepoint where an execution state of a central processing unit is known, and wherein the initialization instruction comprises an instruction to speculatively execute a particular number of instructions;
  initiating speculative execution of a plurality of instruction units in a thread on a processor, starting with a beginning instruction unit in the plurality of instruction units that immediately follows the inserted initialization instruction, wherein:
    at least some of the plurality of instruction units correspond to predetermined safepoints associated with known central processing unit execution states, wherein the predetermined safepoints were determined prior to initiation of speculative execution, and wherein thread execution between two consecutive predetermined safepoints is guaranteed to be atomic;
    at least one of the plurality of instruction units comprises a plurality of machine instructions that emulates one or more virtual instructions;
    thread execution of each of the plurality of instruction units is guaranteed to be atomic; and
    the plurality of instruction units is not programmatically specified to be executed atomically together; and
  in response to a determination that the particular number of instructions are successfully executed atomically without interruption, recording information associated with the atomic execution, including establishing an incidentally atomic sequence of instruction units, wherein the incidentally atomic sequence of instruction units comprises a sequence of instruction units that was incidentally atomically executed, and wherein establishing the incidentally atomic sequence of instruction units includes:
    determining an ending instruction unit, and wherein the incidentally atomic sequence of instruction units corresponds to a sequence of executed instruction units starting at the beginning instruction unit that immediately followed the inserted initialization instruction and ending at the determined ending instruction unit.

20. A computer program product for atomicity detection, the computer program product being embodied in a non-transitory computer readable storage medium and comprising computer instructions for:
  inserting an initialization instruction that is used to facilitate detection of runtime incidental atomicity, wherein the initialization instruction is inserted at a safepoint where an execution state of a central processing unit is known, and wherein the initialization instruction comprises an instruction to speculatively execute a particular number of instructions;
  initiating speculative execution of a plurality of instruction units in a thread on a processor, starting with a beginning instruction unit in the plurality of instruction units that immediately follows the inserted initialization instruction, wherein:
    at least some of the plurality of instruction units correspond to predetermined safepoints associated with known central processing unit execution states, wherein the predetermined safepoints were determined prior to initiation of speculative execution, and wherein thread execution between two consecutive predetermined safepoints is guaranteed to be atomic;
    at least one of the plurality of instruction units comprises a plurality of machine instructions that emulates one or more virtual instructions;
    thread execution of each of the plurality of instruction units is guaranteed to be atomic; and
    the plurality of instruction units is not programmatically specified to be executed atomically together; and
  in response to a determination that the particular number of instructions are successfully executed atomically without interruption, recording information associated with the atomic execution, including establishing an incidentally atomic sequence of instruction units, wherein the incidentally atomic sequence of instruction units comprises a sequence of instruction units that was incidentally atomically executed, and wherein establishing the incidentally atomic sequence of instruction units includes:
    determining an ending instruction unit, and wherein the incidentally atomic sequence of instruction units corresponds to a sequence of executed instruction units starting at the beginning instruction unit that immediately followed the inserted initialization instruction and ending at the determined ending instruction unit.

* * * * *

UNITED STATES PATENT AND TRADEMARK OFFICE
CERTIFICATE OF CORRECTION

| | |
|---|---|
| PATENT NO. | : 9,928,072 B1 |
| APPLICATION NO. | : 12/387478 |
| DATED | : March 27, 2018 |
| INVENTOR(S) | : Gil Tene, Michael A. Wolf and Cliff N. Click, Jr. |

It is certified that error appears in the above-identified patent and that said Letters Patent is hereby corrected as shown below:

In Page 2, Column 1, Item (56), References Cited, Other Publications, Cite No. 4, delete "Memeory" and insert --Memory--, therefor.

In Column 14, Line(s) 29, after "executed instruction units", insert --(i.e.,-- , therefor.

Signed and Sealed this
Nineteenth Day of June, 2018

Andrei Iancu
*Director of the United States Patent and Trademark Office*